（12）United States Patent
Xiao et al.

(10) Patent No.: US 9,467,340 B2
(45) Date of Patent: Oct. 11, 2016

(54) LOGICAL CHANNEL ESTABLISHING METHOD AND SYSTEM, EDGE VIRTUAL BRIDGING STATION AND BRIDGE

(71) Applicant: ZTE Corporation, Shenzhen (CN)

(72) Inventors: Min Xiao, Shenzhen (CN); Azhong Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/417,125

(22) PCT Filed: Jun. 6, 2013

(86) PCT No.: PCT/CN2013/076885
§ 371 (c)(1),
(2) Date: Jan. 23, 2015

(87) PCT Pub. No.: WO2014/015715
PCT Pub. Date: Jan. 30, 2014

(65) Prior Publication Data
US 2015/0172126 A1  Jun. 18, 2015

(30) Foreign Application Priority Data
Jul. 24, 2012  (CN) .......................... 2012 1 0257562

(51) Int. Cl.
*H04L 12/24* (2006.01)
*H04L 12/46* (2006.01)
(Continued)

(52) U.S. Cl.
CPC ....... *H04L 41/0893* (2013.01); *H04L 12/4625* (2013.01); *H04L 12/4679* (2013.01); *H04L 45/245* (2013.01); *H04L 61/2038* (2013.01); *Y02B 60/33* (2013.01)

(58) Field of Classification Search
None
See application file for complete search history.

(56) References Cited

U.S. PATENT DOCUMENTS 8,724,456 B1 * 5/2014 Hong .................... G06F 11/00
370/225
2010/0290472 A1  11/2010 Raman
(Continued)

FOREIGN PATENT DOCUMENTS

CN        102404360 A       4/2012
CN        102480412 A       5/2012

OTHER PUBLICATIONS

International Search Report for corresponding application PCT/CN2013/076885 filed Jun. 6, 2013; Mail date Sep. 19, 2013.
European Search Report for corresponding application EP13823229; Report issued Feb. 23, 2016.
IEEE 802.1, "Multi Channel Discovery and Configuration", vol. 802, No. 6, pp. 1-28, Mar. 16, 2010, XP068007799.
(Continued)

*Primary Examiner* — Brian Roberts
(74) *Attorney, Agent, or Firm* — Cantor Colburn LLP

(57) ABSTRACT

Provided are a logical channel establishing method and system, an edge virtual bridging (EVB) station, and a bridge. The method includes: an EVB station respectively sending a first CDCP message to a first EVB bridge and a second EVB bridge, both of which belong to a same LAG portal, to request for SVIDs corresponding to required logical S-channels, wherein the EVB station requests the first EVB bridge for SVIDs of a part of logical S-channels in the required logical S-channels, and the EVB station requests the second EVB bridge for SVIDs of the rest part of logical S-channels in the required logical S-channels; the EVB station respectively obtaining the SVIDs allocated by the first EVB bridge and the second EVB bridge according to the first CDCP message; and the EVB station configuring the allocated SVIDs to the corresponding logical S-channels, and respectively sending a second CDCP message to the first EVB bridge and the second EVB bridge, to respectively inform the first EVB bridge and the second EVB bridge of all SVIDs configured by the EVB station for the required logical S-channels.

16 Claims, 9 Drawing Sheets

(51) Int. Cl.
*H04L 12/709* (2013.01)
*H04L 29/12* (2006.01)

(56) References Cited

U.S. PATENT DOCUMENTS

| | | | | |
|---|---|---|---|---|
| 2011/0019678 A1* | 1/2011 | Mehta | H04L 12/4625 | 370/401 |
| 2012/0219004 A1* | 8/2012 | Balus | H04L 12/4641 | 370/395.53 |
| 2013/0156028 A1* | 6/2013 | Hernandez | H04L 12/4641 | 370/359 |

OTHER PUBLICATIONS

Norman Finn, "Diagrams to support ballots comments on 802.1AX-REV:", vol. 802.1 Mar. 12, 2012, pp. 1-3, XP068008450.

Rakesh Sharma, LAG Uplink for EVB, "Requirements and Consideration Discussion", vol. 802, No. v02, Sep. 16, 2010, pp. 1-3, XP068007946.

Virtual Bridged Local Area Networks-Amendment XX: Edge Virtual Bridging, Mar. 31, 2011; IEEE Standard Draft, pp. 123-128, XP055246167.

* cited by examiner

LOGICAL CHANNEL ESTABLISHING METHOD AND SYSTEM, EDGE VIRTUAL BRIDGING STATION AND BRIDGE

TECHNICAL FIELD

The present document relates to the field of communications, and in particular to a logical channel establishing method and system, an Edge Virtual Bridging (EVB in short) station, and a bridge.

BACKGROUND

As the concept of cloud computing is proposed and research and deployment of the cloud computing have made progress continuously, taking virtualization of a data centre as a development direction of the data centre has become a consensus in the industry. To put it simply, the data centre is a system containing infrastructures such as servers, storage devices, and a network connecting all the servers and storage devices. The virtualization of the data centre mainly refers to virtualization of the server and virtualization of a data network caused by the virtualization of the server. The so-called virtualization of a server is to allow to create multiple virtual servers which are called Virtual Station (VS in short) on one physical server, and each VS is configured with a separate Internet Protocol (IP in short) address and a separate Media Access Control (MAC in short) address and independently provides services outwards. In order to achieve mutual communication between VSs, the industry also introduces a concept of Edge Relay (ER in short) which can connect multiple VSs. The ER has two specific forms for implementation, with one called Virtual Edge Bridge (VEB in short), and the other one called Virtual Edge Port Aggregator (VEPA in short). The VEB is a virtual switch which has both a relay function and a switching function, and the VEB can directly achieve data communication between the connected VSs. The VEPA is a virtual device which only has a relay function but does not have a switching function, and the VEPA can not directly achieve the data communication between the connected VSs, but it can forward data received from the connected VSs to a physical switch for switching, and the VEPA also can forward data received from the physical switch to the connected VSs, thereby achieving the data communication between the connected VSs by using an external physical switch connected to a physical server.

Because of the rapid development and a large number of actual deployments of the data centre server virtualization technology, it is often required to create multiple ERs on one physical server at the same time. In order to distinguish and identify these ERs, it is required to create multiple channels logically isolated from each other (logical channel in short) between the physical server and the external physical switch, each logical channel corresponding to one ER and serving as a communication path of the VS connected by the ER. International Standard Organization Institute of Electrical and Electronics Engineers (IEEE in short) has developed a set of protocol mechanism to achieve automatic discovery and automatic establishment of a logical channel between a physical server and an external network edge physical switch, and this set of protocol mechanism is called S-Channel Discovery and Configuration Protocol (CDCP in short), which has been taken as a portion of the 802.1Qbg Edge Virtual Bridging (EVB in short) standard and approved by the IEEE in May, 2012.

The IEEE 802.1Qbg defines the whole EVB architecture. FIG. 1 is a schematic diagram of EVB architecture according to the related art. As shown in FIG. 1, one EVB station (i.e., a physical server supporting EVB) may contain multiple ERs, and each ER may connect multiple Virtual Station Interfaces (VSI in short) via multiple Downlink Relay Port (DRP in short), each VSI representing one virtual station. In order to distinguish different ERs, an S-virtual local area network (S-VLAN) component is introduced in the EVB architecture, and the S-VLAN component inside an EVB station and the S-VLAN component inside an EVB bridge (i.e., a physical switch supporting EVB) together form multiple logical S-channels isolated from each other, wherein each S-channel is connected to an Uplink Relay Port (URP in short) of a certain ER and a certain Station-facing Bridge Port (SBP in short) of a tenant identifier encapsulation component inside the EVB bridge. Each of the S-Channel Access Ports (CAP in short) of the S-VLAN component is connected to the URP and SBP correspondingly. An logical port on another side of the S-VLAN component is called Uplink Access Port (UAP in short), and the CDCP protocol defined by the 802.1Qbg standard as mentioned above is operated between the UAP inside the EVB station and the UAP inside the EVB bridge. The logical S-channel is implemented on a data plane by adding an S-VLAN Tag (S-TAG in short) which corresponds to the S-channel to a data frame entering the S-channel, and removing the S-TAG which corresponds to the S-channel from a data frame exiting from the S-channel. With reference to Table 1, Table 1 describes the specific encapsulation format of the S-TAG stipulated by the IEEE 802.1Q-2011 standard.

TABLE 1

| TPID (16 bits) | | |
|---|---|---|
| PCP (3 bits) | DEI (1 bit) | SVID (12 bits) |

As shown in Table 1, the S-TAG contains 16-bit Tag Protocol Identifier (TPID in short), 3-bit Priority Code Point (PCP in short), 1-bit Drop Eligible Indicator (DEI in short), and 12-bit S-virtual local area network identifier (SVID in short). The TPID carries a fixed Ethertype value stipulated by the standard, wherein the Ethertype value allocated by the 802.1Q-2011 standard to the S-TAG is 0x88A8. The PCP and DEI are used for identifying Quality of Service (QoS in short) of the Ethernet frame. The SVID is a field for distinguishing and identifying different logical S-channels in the S-TAG The IEEE 802.1Qbg standard defines a protocol message encapsulation format of the CDCP, and illustrates a protocol communicating process of the CDCP in detail. The protocol message of the CDCP adopts the same outer layer encapsulation as a Link Layer Discovery Protocol (LLDP in short) message defined by the IEEE 802.1AB-2009 standard, and carries specific message contents by means of an encapsulation form of CDCP TLV (type, length, and value). The CDCP is a one-way protocol operated between the UAP of the EVB station and the UAP of the EVB bridge. There is a 1-bit Role field in the CDCP TLV for distinguishing that the sender of the current protocol message is the EVB station or EVB bridge. In addition, the S-VLAN component inside the EVB station and the S-VLAN component inside the EVB bridge respectively operate a CDCP protocol state machine, and complete the transition of a protocol state according to the received protocol message of the CDCP. With reference to FIG. 2, FIG. 2 is a flowchart of a protocol communicating process of the CDCP defined by the IEEE 802.1Qbg standard according to the related art. It should be noted that, in FIG. 2, each step in the protocol communicating process of the CDCP is not executed according to a time order, but triggered by a corresponding CDCP protocol state. The protocol communicating process of the CDCP in the related art includes the following major steps.

Step S201, after the CDCP protocol is initiated, a logical port UAP inside the EVB bridge sends a CDCP message to a logical port UAP inside the EVB station, in order to inform the EVB station of a maximum number of the S-channels supported by the logical port UAP inside the EVB bridge.

Step S202, after the CDCP protocol is initiated, the logical port UAP inside the EVB station sends a CDCP message to the logical port UAP inside the EVB bridge, in order to request SVIDs from the EVB bridge for each S-channel according to the number of S-channels required inside the EVB station.

The CDCP message for requesting SVIDs sent by the EVB station contains multiple pairs of (SCID, SVID) information, wherein the SCID represents an S-Channel ID, which is assigned by the EVB station. In the multiple pairs of (SCID, SVID) information, apart from a necessarily contained default S-channel (1, 1) stipulated by the protocol, SVIDs in the rest pairs are all fixedly set to be an unavailable value 0, representing that the SVIDs have not been allocated yet, and requesting the EVB bridge to perform allocation. For example, if three ERs are contained inside the EVB station and it is required to establish three logical S-channels for external communication of the three ERs, the CDCP message sent to the EVB bridge by the EVB station contains four pairs of (SCID, SVID) information in total, i.e., {(1, 1), (2, 0), (3, 0), and (4, 0)}, to request the EVB bridge to respectively allocate SVIDs to S-channels of which S-channel IDs are 2, 3, and 4.

Step S203, when the CDCP message for requesting SVIDs sent by the EVB station is received by the logical port UAP inside the EVB bridge, the logical port UAP inside the EVB bridge sends a CDCP message to the logical port UAP inside the EVB station, in order to allocate an SVID for each requested S-channel.

The CDCP message for allocating SVIDs sent by the EVB bridge contains multiple pairs of (SCID, SVID) information, wherein the SCIDs are consistent with the SCIDs carried in the CDCP message which is received by the EVB bridge and sent by the EVB station. In the multiple pairs of (SCID, SVID) information, apart from a necessarily contained default S-channel (1, 1) stipulated by the protocol, SVIDs in the rest pairs are all allocated with available values. For example, if the EVB station sends a request for establishing three logical S-channels and if the CDCP message sent by the EVB station to the EVB bridge contains four pairs of (SCID, SVID) information in total, i.e., {(1, 1), (2, 0), (3, 0), and (4, 0)}, the CDCP message sent by the EVB bridge also contains four pairs of (SCID, SVID) information in total, i.e., {(1, 1), (2, 7), (3, 345), and (4, 10)}, to respectively allocate SVID available values 7, 345, and 10 to the S-channels of which S-channel IDs are 2, 3, and 4.

Step S204, after the CDCP message for allocating SVIDs sent by the EVB bridge is received by the logical port UAP inside the EVB station, the logical port UAP inside the EVB station sends a CDCP message to the logical port UAP inside the EVB bridge, to inform the EVB bridge of the SVIDs that have been configured for each S-channel by the EVB station.

The CDCP message indicating the SVIDs that have been allocated sent by the EVB station contains multiple pairs of (SCID, SVID) information, wherein the SCIDs keep unchanged. In the multiple pairs of (SCID, SVID) information, apart from a necessarily contained default S-channel (1, 1) stipulated by the protocol, SVIDs in the rest pairs are all allocated with available values, representing that after the SVIDs allocated by the EVB bridge are received, they have been configured and taken effect at the EVB station. For example, if the EVB station sends a request for establishing three logical S-channels and if the CDCP message sent by the EVB bridge to the EVB station contains four pairs of (SCID, SVID) information in total, i.e., {(1, 1), (2, 7), (3, 345), and (4, 10)}, to respectively allocate SVID available values 7, 345, and 10 to the S-channels of which S-channel IDs are 2, 3, and 4, then the CDCP message sent by the EVB station to the EVB bridge also contains four pairs of SCID and SVID information in total, i.e., {(1, 1), (2, 7), (3, 345), and (4, 10)}, to confirm that the EVB station has respectively configured SVID available values 7, 345, and 10 for the S-channels of which S-channel IDs are 2, 3, and 4.

The IEEE 802.1AX-2008 standard defines a single node link aggregation technology, which is to logically bind multiple physical links at one node which are connected to the same adjacent node so as to be used as one logical link (i.e., a Link Aggregation Group, LAG in short), achieving the load sharing of service traffic among these multiple physical member links constituting the LAG, and under the condition where some of the member links have a fault, fast switching the service traffic to other member links which are with no fault, thus achieving the redundancy protection function. Currently, the IEEE 802.1AX-REV project is revising and expanding the single node link aggregation technology defined by the 802.1AX-2008 standard, and aims to formulate a cross-node link aggregation working mechanism that can logically bind multiple physical links at one or more nodes which are connected to multiple different adjacent nodes so as to be used as one logical link. The purpose of the cross-node link aggregation technology is consistent with that of the single node link aggregation technology, i.e., the purpose is to achieve the load sharing and redundancy protection of the service traffic among the LAG member links. The 802.1AX-REV draft standard (version D0.2, published in May, 2012) stipulates that, during the implementation of the cross-node link aggregation technology, one or more nodes at a side of the LAG constitute a portal together; and if multiple nodes constitute a portal, there should be a physical link between every two of the multiple nodes, wherein the physical link is called Intra-Portal Link (IPL in short) and is regarded as a channel of exchanging information required for completing the link aggregation by multiple nodes in one portal, and node ports used as two ends of the IPL are called Intra-Portal Link Port (IPP in short). In addition, the 802.1AX-REV draft standard further stipulates that, during the implementation of the cross-node link aggregation technology, the service traffic should perform the load sharing among the LAG member links on the basis of an outer layer VLAN tag, that is to say, data frames carrying different outer layer VLAN tags (i.e., different VIDs are contained in the outer layer VLAN tag) are allocated to different physical member links for transmission according to a certain algorithm. With regard to a specific allocation algorithm, the draft standard has not stipulated yet, but it is required that the two portals at two sides of the LAG adopt the same allocation algorithm so as to ensure that, at both directions of the LAG, the same physical member link is selected for data frames carrying the same outer layer VLAN tag.

In current actual deployments of the data centre, for achieving high bandwidth and high reliability of a server when accessing an external network, the server is required to access two network edge physical switches via two physical ports at the same time, and this access manner is called dual-homing access. Currently, the most common method for server dual-homing access is to use the cross-node link aggregation technology. Combining the current EVB architecture defined by the 802.1Qbg standard and the method that use the cross-node link aggregation technology to achieve server dual-homing access, FIG. 3 is a schematic diagram of architecture in which an EVB station accesses two EVB bridges in a dual-homing manner according to the related art. As shown in FIG. 3, the S-VLAN component inside the EVB station is respectively connected to the S-VLAN component inside EVB bridge 1 and the S-VLAN component inside EVB bridge 2; the EVB station itself constitutes one LAG portal at one side of the LAG; and the EVB bridge 1 and the EVB bridge 2 constitute one LAG portal at the other side of the LAG, and the EVB bridge 1 and the EVB bridge 2 are connected by the IPL.

However, the CDCP protocol defined by the currently formulated IEEE 802.1Qbg standard is only applicable to the condition where an EVB station operating the protocol accesses one network edge physical switch via one physical port, but can not be applied to the condition where an EVB station operating the protocol uses the cross-node link aggregation technology to access two network edge physical switches in a dual-homing manner via two physical ports.

With regard to the problem that the CDCP protocol can not be used to achieve that an EVB station accesses two network edge physical switches in a dual-homing manner via two physical ports in the related art, no effective solution has been presented.

SUMMARY

The embodiments of the present document provide a logical channel establishing scheme, so as to at least solve the problem that the CDCP protocol can not be used to achieve that an EVB station accesses two network edge physical switches in a dual-homing manner via two physical ports in the above-mentioned related art.

According to an aspect of the embodiment of the present document, a logical channel establishing method is provided, including: an EVB station respectively sending a first CDCP message to a first EVB bridge and a second EVB bridge, both of which belong to a same LAG portal, to request for SVIDs corresponding to required logical S-channels, wherein the EVB station requests the first EVB bridge for SVIDs of a part of logical S-channels in the required logical S-channels, and the EVB station requests the second EVB bridge for SVIDs of the rest part of the logical S-channels in the required logical S-channels; the EVB station respectively obtaining the SVIDs allocated by the first EVB bridge and the second EVB bridge according to the first CDCP message; and the EVB station configuring the allocated SVIDs to the corresponding logical S-channels, and respectively sending a second CDCP message to the first EVB bridge and the second EVB bridge, to respectively inform the first EVB bridge and the second EVB bridge of all SVIDs configured by the EVB station for the required logical S-channels.

In the described embodiment, before the EVB station respectively sends the first CDCP message to the first EVB bridge and the second EVB bridge, the method further includes: an uplink access port (UAP) inside the first EVB bridge and a UAP inside the second EVB bridge respectively sending a third CDCP message to a UAP inside the EVB station, to respectively inform the EVB station of a maximum number of S-channels supported by the UAP inside the first EVB bridge and a maximum number of S-channels supported by the UAP inside the second EVB bridge.

In the described embodiment, multiple pairs of S-Channel ID (SCID) and SVID information groups are carried in the first CDCP message, wherein values of the SVIDs include: a first predetermined value or a second predetermined value, the first predetermined value being used for indicating that it is required to allocate SVIDs of logical S-channels corresponding to the SCIDs which are paired with the SVIDs, and the second pre-determined value being used for indicating that it is unnecessary to allocate SVIDs of logical S-channels corresponding to SCIDs which are paired with the SVIDs.

In the described embodiment, the first predetermined value is 0, and the second predetermined value is 0xFFF.

In the described embodiment, multiple pairs of SCID and SVID information groups are carried in the second CDCP message, wherein values of the SVIDs include: SVIDs obtained from the first EVB bridge and have been configured to corresponding logical S-channels and SVIDs obtained from the second EVB bridge and have been configured to corresponding logical S-channels.

In the described embodiment, before the EVB station respectively obtains the SVIDs allocated by the first EVB bridge and the second EVB bridge according to the first CDCP message, the method further includes: the first EVB bridge and the second EVB bridge respectively determining, according to the first CDCP message received from the EVB station, SCIDs requiring to be allocated with SVIDs by the first EVB bridge and SCIDs requiring to be allocated with SVIDs by the second EVB bridge, and allocating corresponding SVIDs to the determined SCIDs.

In the described embodiment, before the first EVB bridge and the second EVB bridge respectively determine, according to the received first CDCP message, SCIDs requiring to be allocated with SVIDs by the first EVB bridge and SCIDs requiring to be allocated with SVIDs by the second EVB bridge, the method further includes: the first EVB bridge and the second EVB bridge sending an S-channel request authentication message to each other, performing comparison based on S-channel information carried in the first CDCP message received by the first EVB bridge from the EVB station and S-channel information carried in the first CDCP message received by the second EVB bridge from the EVB station, and determining that the logical S-channels to which the EVB station requests the first EVB bridge to allocate the SVIDs and the logical S-channels to which the EVB station requests the second EVB bridge to allocate the SVIDs are complementary.

In the described embodiment, comparing S-channel information carried in the first CDCP message received by the first EVB bridge from the EVB station and S-channel information carried in the first CDCP message received by the second EVB bridge from the EVB station includes: respectively extracting, from the first CDCP message received by the first EVB bridge and the first CDCP message received by the second EVB bridge, logical S-channels requiring to be allocated with SVIDs by the first EVB bridge and logical S-channels requiring to be allocated with SVIDs by the second EVB bridge, and performing comparison; and upon a result of the comparison representing identicalness, determining that the logical S-channels to which the EVB station requests the first EVB bridge to allocate the SVIDs and the logical S-channels to which the EVB station requests the second EVB bridge to allocate the SVIDs are complementary, and authentication being passed; otherwise, determining that the logical S-channels to which the EVB station requests the first EVB bridge to allocate the SVIDs and the logical S-channels to which the EVB station requests the second EVB bridge to allocate the SVIDs are not complementary, the authentication being failed, and informing the EVB station of logical S-channels corresponding to the authentication failure.

In the described embodiment, after the EVB station respectively informs the first EVB bridge and the second EVB bridge of all the SVIDs configured by the EVB station for the required logical S-channels, the method further includes: the first EVB bridge and the second EVB bridge receiving the second CDCP message from the EVB station for informing the first EVB bridge and the second EVB bridge of all the SVIDs configured by the EVB station for the required logical S-channels, and performing corresponding processing, wherein SVIDs allocated by the present bridge in all the SVIDs are configured to corresponding logical S-channels, and SVIDs allocated by a bridge other than the present bridge in all the SVIDs are saved as standby information about link aggregation protection.

According to another aspect of the embodiment of the present document, an EVB station is provided, including: a sending component, configured to respectively send a first CDCP message to a first EVB bridge and a second EVB bridge, both of which belong to a same LAG portal, to request for SVIDs corresponding to required logical S-channels, wherein the EVB station requests the first EVB bridge for SVIDs of a part of logical S-channels in the required logical S-channels, and the EVB station requests the second EVB bridge for SVIDs of the rest part of the logical S-channels in the required logical S-channels; a receiving component, configured to respectively obtain the SVIDs allocated by the first EVB bridge and the second EVB bridge according to the first CDCP message; a configuration component, configured to configure the allocated SVIDs received by the receiving component to the corresponding logical S-channels; and an informing component, configured to respectively send a second CDCP message to the first EVB bridge and the second EVB bridge, to respectively inform the first EVB bridge and the second EVB bridge of all SVIDs configured by the EVB station for the required logical S-channels.

According to still another aspect of the embodiment of the present document, an EVB bridge is provided, including: an allocation component, configured to identify, from a first CDCP message received from a EVB station, a part of logical S-channels requiring to be allocated with SVIDs by the EVB bridge in required logical S-channels of the EVB station, to allocate corresponding SVIDs to the part of logical S-channels, and to send the allocated SVIDs to the EVB station, wherein the first CDCP message is used for requesting for SVIDs corresponding to the required logical S-channels of the EVB station, and SVIDs corresponding to the rest part of logical S-channels of the required logical S-channels of the EVB station in the first CDCP message are allocated by another EVB bridge which belongs to a same LAG portal as the present EVB bridge.

In the described embodiment, the EVB bridge further includes: an informing information processing component, configured to, according to the second CDCP message received from the EVB station for informing the EVB bridge of all the SVIDs configured by the EVB station for the required logical S-channels, perform corresponding processing, wherein SVIDs allocated by the present bridge in all the SVIDs are configured to corresponding logical S-channels, and SVIDs allocated by a bridge other than the present bridge in all the SVIDs are saved as standby information about link aggregation protection.

In the described embodiment, the above-mentioned EVB bridge further includes: an authentication component, configured to, according to the first CDCP message received from the EVB station, send an S-channel request authentication message to each other between the present bridge and the another EVB bridge, performing comparison based on S-channel information carried in the first CDCP message received by the present bridge from the EVB station and S-channel information carried in the first CDCP message received by the another EVB bridge from the EVB station, and determine that logical S-channels to which the EVB station requests to allocate the SVIDs and logical S-channels to which the EVB station requests the another EVB bridge to allocate the SVIDs are complementary.

According to yet another aspect of the embodiment of the present document, a logical channel establishing system is further provided, including: the above-mentioned EVB station, the above-mentioned EVB bridge, and the another EVB bridge which belongs to the same LAG portal as the EVB bridge.

In the embodiments of the present document, an EVB station respectively request a part of required logical S-channels from a first EVB bridge and a second EVB bridge, both of which belong to a same LAG portal, then to respectively configure the allocated SVIDs obtained from the first EVB bridge and the second EVB bridge to corresponding logical S-channels, and to respectively inform the first EVB bridge and the second EVB bridge of all the SVIDs configured by the EVB station for the required logical S-channels; and the problem that the CDCP protocol can not be used to achieve that an EVB station accesses two network edge physical switches in a dual-homing manner via two physical ports in the related art is solved, thus achieving load sharing of server traffic and redundancy protection of an uplink, and improving the stability and accuracy of the system.

BRIEF DESCRIPTION OF THE DRAWINGS

Drawings, provided for further understanding of the present document and forming a part of the specification, are used to explain the present document together with embodiments of the present document rather than to limit the present document. In the drawings.

DETAILED DESCRIPTION OF THE EMBODIMENTS

The present document is described below with reference to the accompanying drawings and embodiments in detail. It should be noted that the embodiments of the present application and the characteristics of the embodiments can be combined with each other if there is no conflict.

Figure 1:
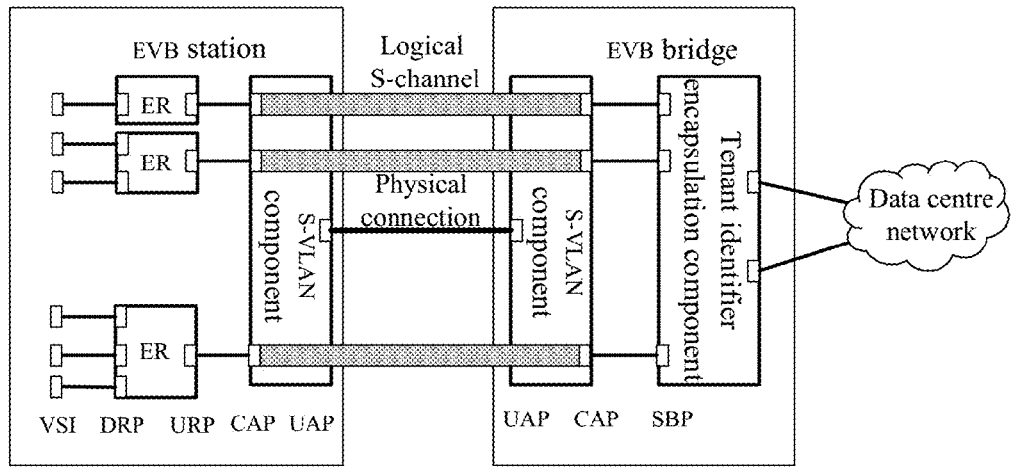
FIG. 1 is a schematic diagram of EVB architecture according to the related art.
Figure 2:
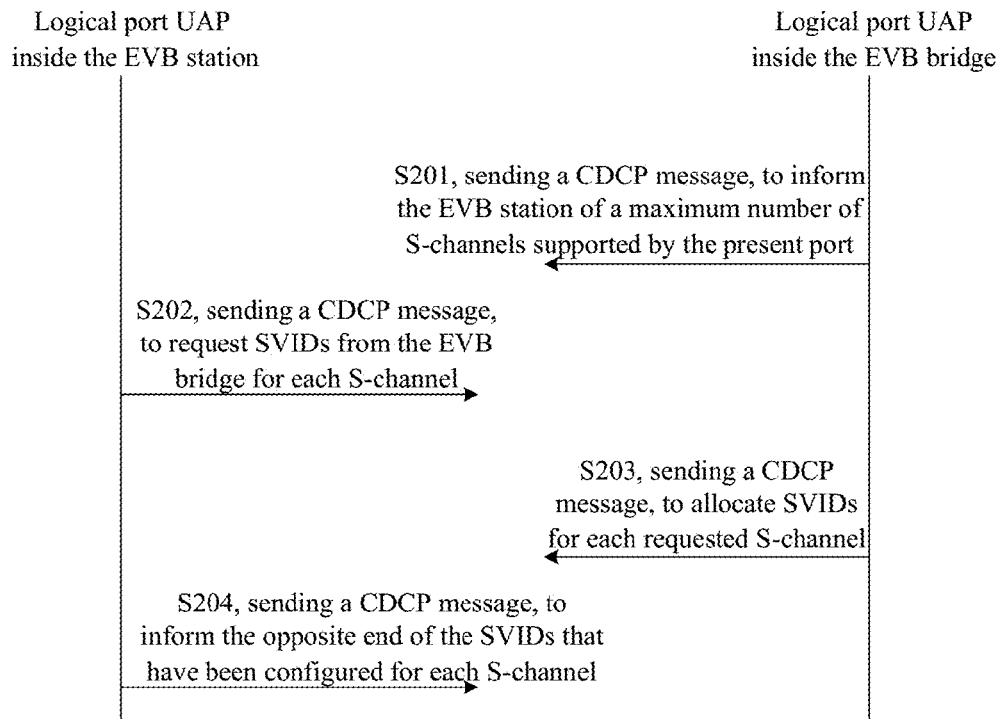
FIG. 2 is a flowchart of a protocol communicating process of the CDCP defined by the IEEE 802.1Qbg standard according to the related art.
Figure 3:
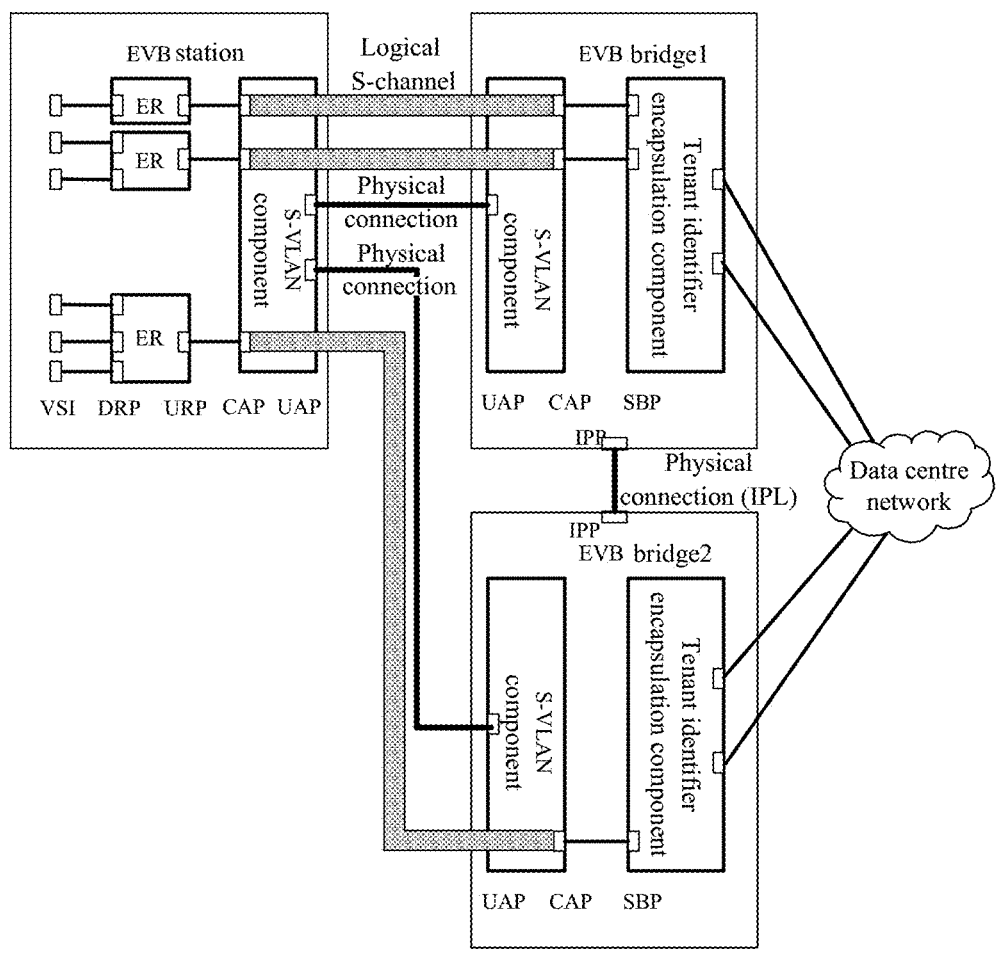
FIG. 3 is a schematic diagram of architecture in which an EVB station accesses two EVB bridges in a dual-homing manner according to the related art.
Figure 4:
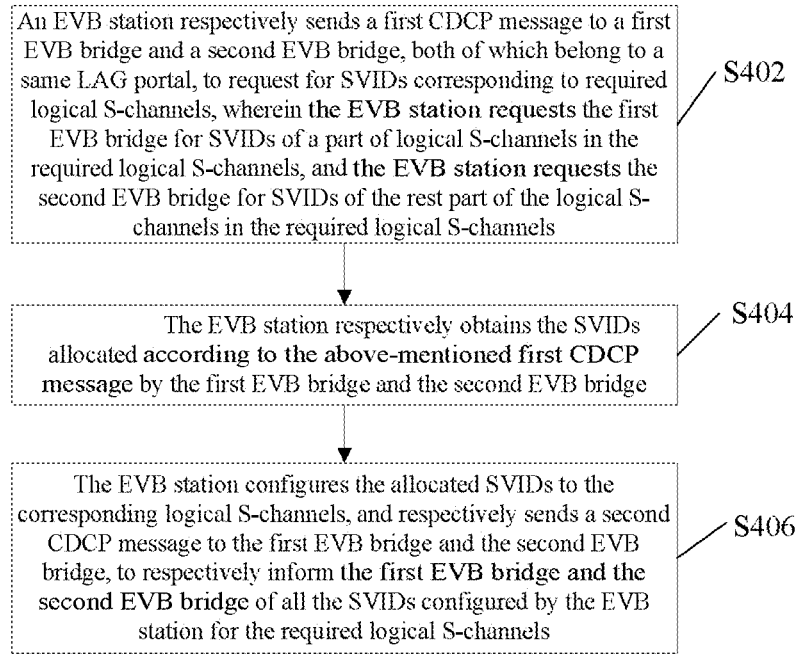
FIG. 4 is a flowchart of a logical channel establishing method according to embodiments of the present document.

According to embodiments of the present document, a logical channel establishing method is provided. FIG. 4 is a flowchart of a logical channel establishing method according to embodiments of the present document. As shown in FIG. 4, the method includes the following steps:

Step S402, an EVB station respectively sends a first CDCP message to a first EVB bridge (i.e., EVB bridge 1) and a second EVB bridge (i.e., EVB bridge 2), both of which belong to a same LAG portal, to request for SVIDs corresponding to required logical S-channels, wherein the EVB station requests the first EVB bridge for SVIDs of a part of logical S-channels in the required logical S-channels, and the EVB station requests the second EVB bridge for SVIDs of the rest part of the logical S-channels in the required logical S-channels;

Step S404, the EVB station respectively obtains the SVIDs allocated by the first EVB bridge and the second EVB bridge according to the above-mentioned first CDCP message; and Step S406, the EVB station configures the allocated SVIDs to the corresponding logical S-channels, and respectively sends a second CDCP message to the first EVB bridge and the second EVB bridge, to respectively inform the first EVB bridge and the second EVB bridge of all SVIDs configured by the EVB station for the required logical S-channels.

In the above-mentioned steps, an EVB station respectively requests a part of required logical S-channels from a first EVB bridge and a second EVB bridge, both of which belong to a same LAG portal, then respectively configures the allocated SVIDs obtained from the first EVB bridge and the second EVB bridge to corresponding logical S-channels, and respectively informs the first EVB bridge and the second EVB bridge of all the SVIDs configured by the EVB station for the required logical S-channels. By virtue of the above solution, the problem that the CDCP protocol can not be used to achieve that an EVB station accesses two network edge physical switches in a dual-homing manner via two physical ports in the related art is solved, thus achieving load sharing of server traffic and redundancy protection of an uplink, and improving the stability and accuracy of the system.

In an example embodiment, before the step S402, an uplink access port (UAP) inside the first EVB bridge and a UAP inside the second EVB bridge respectively send a third CDCP message to a UAP inside the EVB station, to respectively inform the EVB station of a maximum number of S-channels supported by the UAP inside the first EVB bridge and a maximum number of S-channels supported by the UAP inside the second EVB bridge. In this way, the EVB station may know a maximum number of S-channels respectively supported by the first EVB bridge and the second bridge, and it is more targeted when the EVB station sends a request for allocating SVIDs for required logical S-channels, thus improving the accuracy and processing efficiency of the system.

In an example embodiment, in step S402, multiple pairs of SCID and SVID information groups are carried in the first CDCP message for requesting to allocate SVIDs sent to the first EVB bridge and the second bridge by the EVB station, wherein values of the SVIDs in the information groups include:

a first predetermined value or a second predetermined value, the first predetermined value being used for indicating that it is required to allocate SVIDs of logical S-channels corresponding to the SCIDs which are paired with the SVIDs, and the second pre-determined value being used for indicating that it is unnecessary to allocate SVIDs of logical S-channels corresponding to the SCIDS which are paired with the SVIDs. For example, during an implementation, the first predetermined value may be 0; and the second predetermined value may be 0xFFF. The method is simple and useful, and is easy to operate.

For example, under the condition where the first EVB bridge receives a CDCP message for requesting to allocate the SVID, in which a value of an SVID in the information group is 0, the first EVB bridge determines that the first EVB bridge needs to allocate an SVID corresponding to this SCID of the information group; similarly, under the condition where the second EVB bridge receives a CDCP message for requesting to allocate the SVID, in which a value of an SVID in the information group is 0, the second EVB bridge determines that the second EVB bridge needs to allocate an SVID corresponding to this SCID of the information group. Under the condition where a value of an SVID in the received information group which is received by the first EVB bridge is 0xFFF, the first EVB bridge determines that the SVID will be allocated by the second EVB bridge, and the first EVB bridge does not need to allocate an SVID corresponding to this SCID of the information group where the SVID is in. And similarly, under the condition where a value of an SVID in the received information group which is received by the second EVB bridge is 0xFFF, the second EVB bridge determines that the SVID will be allocated by the first EVB bridge, and the second EVB bridge does not need to allocate an SVID corresponding to this SCID of the information group where the SVID is in.

In an example embodiment, in the step S406, multiple pairs of SCID and SVID information groups are carried in the second CDCP message which informs of all the configured SVIDs, wherein values of the SVIDs include: SVIDs obtained from the first EVB bridge and have been configured to corresponding logical S-channels and SVIDs obtained from the second EVB bridge and have been configured to corresponding logical S-channels.

In an example embodiment, before the step S404, the first EVB bridge and the second EVB bridge may respectively determine, according to the first CDCP message received from the EVB station, SCIDs requiring to be allocated with SVIDs by the first EVB bridge and SCIDs requiring to be allocated with SVIDs by the second EVB bridge, and allocate corresponding SVIDs to the determined SCIDs.

In an example embodiment, before the first EVB bridge and the second EVB bridge respectively determine, according to the received first CDCP message, SCIDs requiring to be allocated with SVIDs by the first EVB bridge and SCIDs requiring to be allocated with SVIDs by the second EVB bridge, the first EVB bridge and the second EVB bridge may also send an S-channel request authentication message to each other, perform comparison based on S-channel information carried in the first CDCP message received by the first EVB bridge from the EVB station and S-channel information carried in the first CDCP message received by the second EVB bridge from the EVB station, and determine that the logical S-channels to which the EVB station requests the first EVB bridge to allocate the SVIDs and the logical S-channels to which the EVB station requests the second EVB bridge to allocate the SVIDs are complementary. That is to say, after the first EVB bridge receives the first CDCP message for requesting to allocate SVIDs from the EVB station, and the second EVB bridge receive the first CDCP message for requesting to allocate SVIDs from the EVB station, the first EVB bridge and the second EVB bridge need to authenticate whether the logical S-channels requiring the allocation by the first EVB bridge and the logical S-channels requiring the allocation by the second EVB bridge are complementary by sending an S-channel request authentication message to each other. Only after the authentication is passed, the first EVB bridge and the second EVB bridge may allocate SVIDs requested by the EVB station. In this way, the precision and reliability of the system are further improved.

In an example embodiment, comparing S-channel information carried in the first CDCP message received by the first EVB bridge from the EVB station and S-channel information carried in the first CDCP message received by the second EVB bridge from the EVB station may include: respectively extracting, from the first CDCP message received by the first EVB bridge and the first CDCP message received by the second EVB bridge, logical S-channels requiring to be allocated with SVIDs by the first EVB bridge and logical S-channels requiring to be allocated with SVIDs by the second EVB bridge, and performing comparison; and upon a result of the comparison representing identicalness, determining that the logical S-channels to which the EVB station requests the first EVB bridge to allocate the SVIDs and the logical S-channels to which the EVB station requests the second EVB bridge to allocate the SVIDs are complementary, and authentication being passed; otherwise, determining that the logical S-channels to which the EVB station requests the first EVB bridge to allocate the SVIDs and the logical S-channels to which the EVB station requests the second EVB bridge to allocate the SVIDs are not complementary, the authentication being failed, and informing the EVB station of logical S-channels corresponding to the authentication failure. The first EVB bridge and the second EVB bridge allocate the requested SVIDs to logical S-channels of which authentication passes. If authentication is failed, it is required to inform the EVB station, and the first EVB bridge and the second EVB bridge do not need to allocate the requested SVIDs to logical S-channels of which authentication fails.

In step S406, when the EVB station informs the first EVB bridge and the second EVB bridge of all the SVIDs configured for the required logical S-channels, since the first EVB bridge and the second EVB bridge do not allocate the requested SVIDs to the logical S-channels of which authentication is failed, when the EVB station informs the first EVB bridge and the second EVB bridge of all the SVIDs configured for the required logical S-channels, the logical S-channels of which authentication fails do not have corresponding SVIDs, i.e., the logical S-channels of which authentication passes are established, while the logical S-channels of which authentication fails are not established.

In an example embodiment, after the step S406, the first EVB bridge and the second EVB bridge receive the second CDCP message from the EVB station for informing the first EVB bridge and the second EVB bridge of all the SVIDs configured by the EVB station for the required logical S-channels, and perform corresponding processing, wherein SVIDs allocated by the present bridge in all the SVIDs are configured to corresponding logical S-channels, and SVIDs allocated by a bridge other than the present bridge in all the SVIDs are saved as standby information about link aggregation protection. That is to say, among all the SVIDs configured by the EVB station for the required logical S-channels, the first EVB bridge configures the SVIDs allocated by the first EVB bridge itself to corresponding logical S-channels, and save the SVIDs which are not allocated by the first EVB bridge as standby information about link aggregation protection; and the second EVB bridge configures the SVIDs allocated by the second EVB bridge itself to corresponding logical S-channels, and save the SVIDs which are not allocated by the second EVB bridge as standby information about link aggregation protection.

Figure 5:
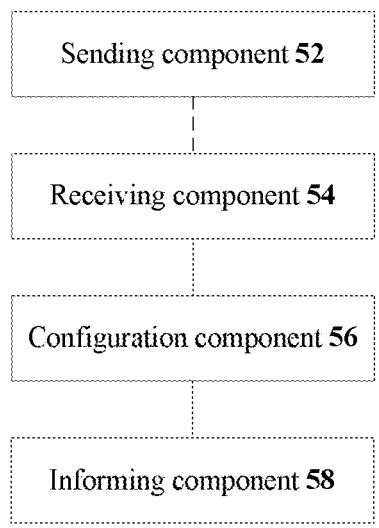
FIG. 5 is a structure block diagram of an EVB station according to embodiments of the present document.

Corresponding to the above-mentioned method, embodiments of the present document also provide an EVB station. FIG. 5 is a structure block diagram of an EVB station according to embodiments of the present document. As shown in FIG. 5, the EVB station 50 includes: a sending component 52, configured to respectively send a first CDCP message to a first EVB bridge and a second EVB bridge, both of which belong to a same LAG portal, to request for SVIDs corresponding to required logical S-channels, wherein the EVB station requests the first EVB bridge for SVIDs of a part of logical S-channels in the required logical S-channels, and the EVB station requests the second EVB bridge for SVIDs of the rest part of the logical S-channels in the required logical S-channels; a receiving component 54, configured to respectively obtain the SVIDs allocated by the first EVB bridge and the second EVB bridge according to the first CDCP message; a configuration component 56, which is coupled to the receiving component 54, configured to configure the allocated SVIDs received by the receiving component 54 to corresponding logical S-channels; and an informing component 58, which is coupled to the configuration component 56, configured to respectively send a second CDCP message to the first EVB bridge and the second EVB bridge, to respectively inform the first EVB bridge and the second EVB bridge of all SVIDs configured by the EVB station for the required logical S-channels.

In the above-mentioned EVB station 50, the sending component 52 respectively requests a part of the required logical S-channels from the first EVB bridge and the second EVB bridge, both of which belong to the same LAG portal; then the configuration component 56 will respectively configure the allocated SVIDs obtained from the first EVB bridge and the second EVB bridge via the receiving component 54 to corresponding logical S-channels; and the informing component 58 respectively informs the first EVB bridge and the second EVB bridge of all SVIDs configured by the EVB station for the required logical S-channels; and the problem that the CDCP protocol can not be used to achieve that an EVB station accesses two network edge physical switches in a dual-homing manner via two physical ports in the related art is solved, thus achieving load sharing of server traffic and redundancy protection of an uplink, and improving stability and accuracy of the system.

Figure 6:
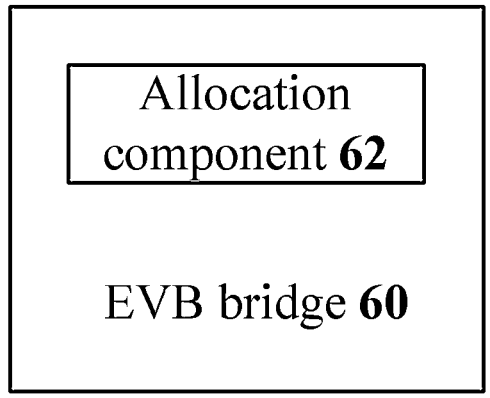
FIG. 6 is a structure block diagram of an EVB bridge according to embodiments of the present document.

According to embodiments of the present document, an EVB bridge is also provided. FIG. 6 is a structure block diagram of an EVB bridge according to embodiments of the present document; and as shown in FIG. 6, the EVB bridge 60 includes: an allocation component 62, configured to identify, from a first S-channel discovery and configuration protocol (CDCP) message received from the EVB station, a part of logical S-channels requiring to be allocated with S-virtual local area network identifiers (SVIDs) by the EVB bridge in required logical S-channels of the EVB station, to allocate corresponding SVIDs to the part of logical S-channels, and to send the allocated SVIDs to the EVB station, wherein the first CDCP message is used for requesting for SVIDs corresponding to the required logical S-channels of the EVB station, and SVIDs corresponding to the rest part of logical S-channels of the required logical S-channels of the EVB station in the first CDCP message are allocated by another EVB bridge which belongs to a same LAG portal as the present EVB bridge.

Figure 7:
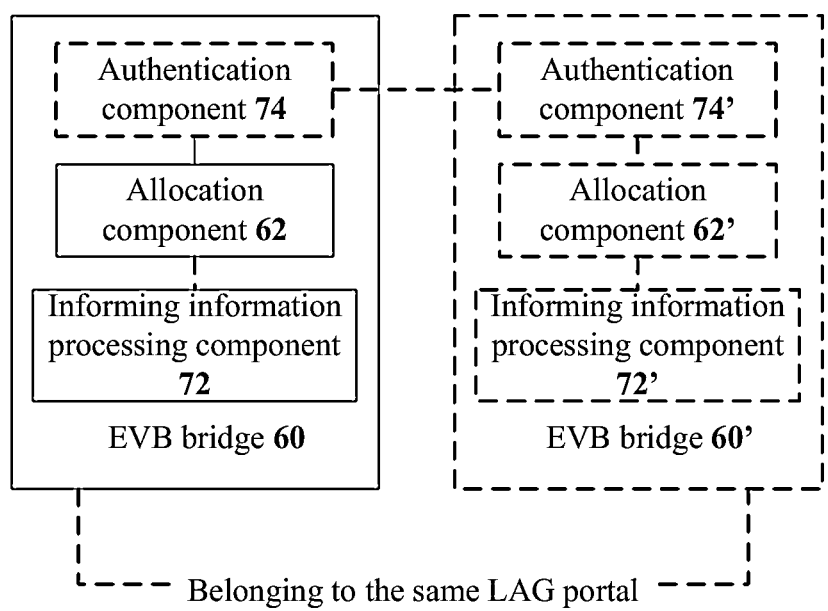
FIG. 7 is a structure block diagram of an EVB bridge according to an example embodiment of the present document.

FIG. 7 is a structure block diagram of an EVB bridge according to an example embodiment of the present document; and as shown in FIG. 7, the EVB bridge 60 further includes: an informing information processing component 72, configured to, according to the second CDCP message received from the EVB station for informing the EVB bridge of all the SVIDs configured by the EVB station for the required logical S-channels, perform corresponding processing, wherein SVIDs allocated by the present bridge in all the SVIDs are configured to corresponding logical S-channels, and SVIDs allocated by a bridge other than the present bridge in all the SVIDs are saved as standby information about link aggregation protection.

In an example embodiment, the EVB bridge 60 further includes: an authentication component 74, configured to, according to the first CDCP message received from the EVB station, send an S-channel request authentication message to each other between the present bridge and the another EVB bridge, performing comparison based on S-channel information carried in the first CDCP message received by the present bridge from the EVB station and S-channel information carried in the first CDCP message received by the another EVB bridge from the EVB station, and determine that logical S-channels to which the EVB station requests the present bridge to allocate the SVIDs and logical S-channels to which the EVB station requests the another EVB bridge to allocate the SVIDs are complementary.

Figure 8:
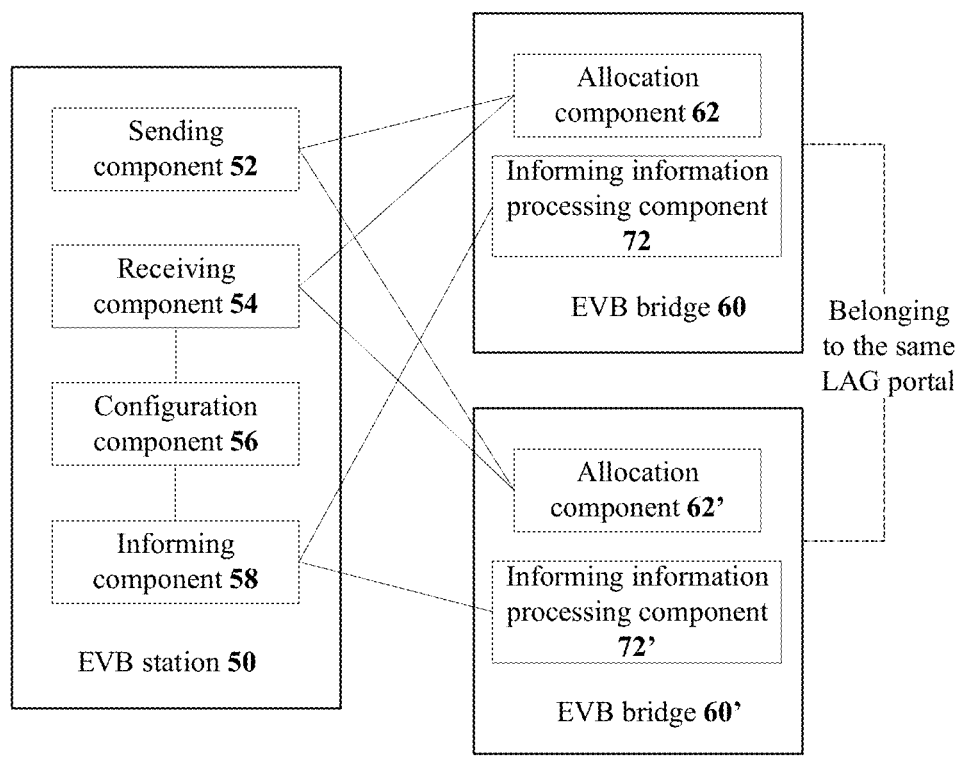
FIG. 8 is a structure block diagram of a logical channel establishing system according to embodiments of the present document.

Embodiments of the present document also provide a logical channel establishing system. FIG. 8 is a structure block diagram of a logical channel establishing system according to embodiments of the present document; and as shown in FIG. 8, the logical channel establishing system includes the above-mentioned EVB station 50, the above-mentioned EVB bridge 60, and another EVB bridge 60' which belongs to the same LAG portal as the EVB bridge 60.

Figure 9:
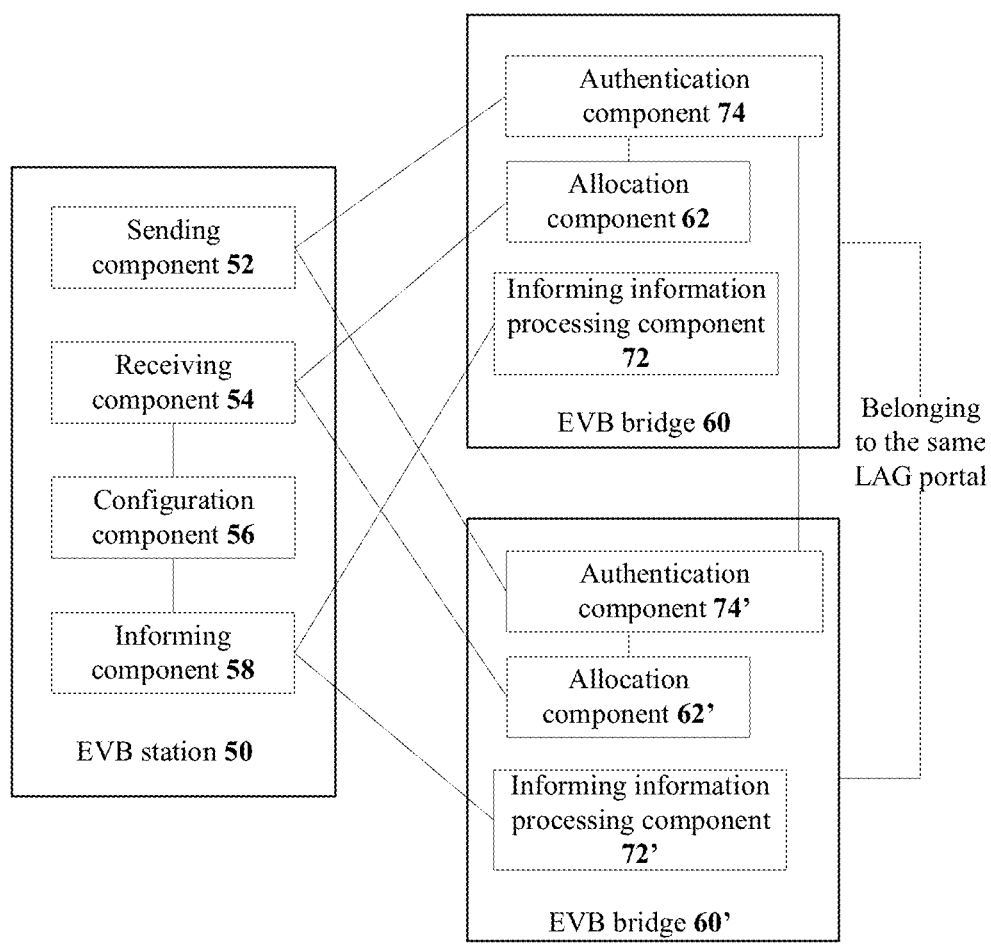
FIG. 9 is a structure block diagram of a logical channel establishing system according to an example embodiment of the present document.

FIG. 9 is a structure block diagram of a logical channel establishing system according to an example embodiment of the present document; as shown in FIG. 9, the EVB bridge 60 of the system includes: an informing information processing component 72 and an authentication component 74; and another EVB bridge 60' which belongs to the same LAG portal as the EVB bridge 60 includes: informing information processing component 72' and an authentication component 74'. When the authentication passes, the EVB bridge 60 and the EVB bridge 60' allocate the requested SVIDs to the EVB station 50.

The implementation process of the above-mentioned embodiments is further described below in detail with reference to example embodiments and drawings.

Embodiment 1

The present embodiment provides, by expanding the CDCP protocol mechanism stipulated by the IEEE 802.1Qbg standard and exchanged information between EVB bridges of one portal, a method for establishing logical channels in a server dual-homing access scenario. The method can meet both the technical requirements of the EVB architecture and cross-node link aggregation of the related art, thus achieving load sharing of server traffic and redundancy protection of an uplink.

Figure 10:
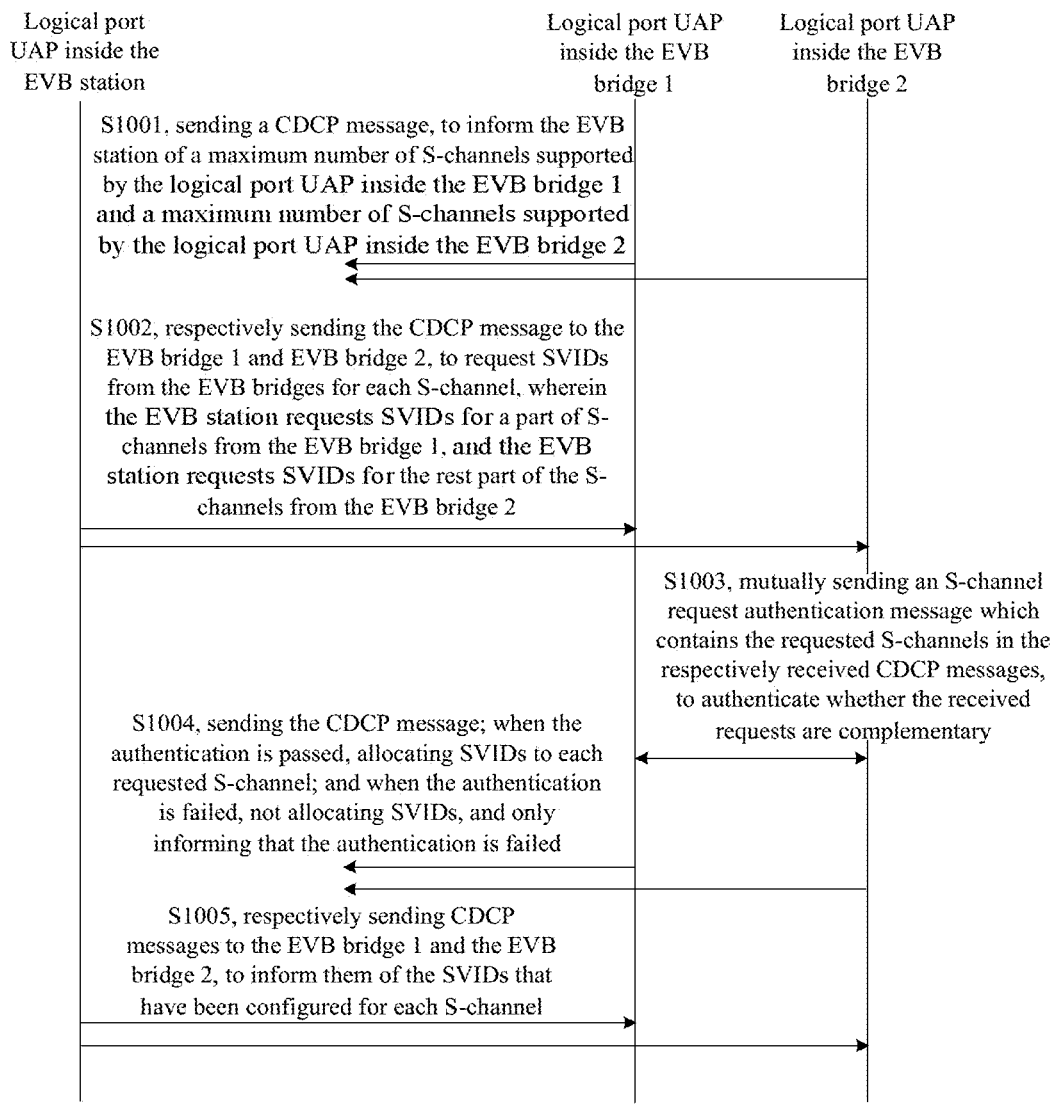
FIG. 10 is a flowchart showing a protocol communicating process of establishing logical channels in a server dual-homing access scenario according to embodiment 1 of the present document.

FIG. 10 is a flowchart showing a protocol communicating process of establishing logical channels in a server dual-homing access scenario according to embodiment 1 of the present document. As shown in FIG. 10, the flow includes the following steps.

Step S1001, after the LAG and CDCP protocol are initiated, a logical port UAP inside EVB bridge 1 and a logical port UAP inside EVB bridge 2 respectively send a CDCP message to a logical port UAP inside the EVB station, to inform the EVB station of a maximum number of S-channels supported by the logical port UAP inside the EVB bridge 1 and a maximum number of S-channels supported by the logical port UAP inside the EVB bridge 2.

Step S1002, after the LAG and CDCP protocol are initiated, the logical port UAP inside the EVB station respectively sends a CDCP message to the logical port UAP inside the EVB bridge 1 and the logical port UAP inside the EVB bridge 2, to request SVIDs from the EVB bridges for each S-channel according to the number of S-channels required by the EVB station, wherein the EVB station requests SVIDs for a part of S-channels from the EVB bridge 1, and the EVB station requests SVIDs for the rest part of the S-channels from the EVB bridge 2.

It is an entirely local behaviour of the EVB station that how the EVB station allocates the number of the S-channels requested from the EVB bridge 1 and the number of the S-channels requested from the EVB bridge 2, which may be assigned manually and may also be allocated automatically.

Herein, the CDCP message for requesting SVIDs sent by the EVB station contains multiple pairs of (SCID, SVID) information, and the CDCP message sent to the EVB bridge 1 and the CDCP message sent to the EVB bridge 2 contain the same number of SCIDs with the same assigned SCID values. The differences between the CDCP message sent to the EVB bridge 1 and the CDCP message sent to the EVB bridge 2 lie in that in multiple pairs of (SCID, SVID) information contained in the CDCP message sent to the EVB bridge 1, SVIDs corresponding to S-channels whose SVIDs need to be requested from the EVB bridge 1 are set to be 0, and SVIDs corresponding to S-channels whose SVIDs need to be requested from the EVB bridge 2 are set to be an unavailable value 0xFFF, representing that the SVIDs will be allocated by other EVB bridges of the same portal; and in multiple pairs of (SCID, SVID) information contained in the CDCP message sent to the EVB bridge 2, SVIDs corresponding to S-channels whose SVIDs need to be requested from the EVB bridge 2 are set to be 0, and SVIDs corresponding to S-channels whose SVIDs need to be requested from the EVB bridge 1 are set to be an unavailable value 0xFFF, representing that the SVIDs will be allocated by other EVB bridges of the same portal.

Step S1003, after the EVB bridge 1 and the EVB bridge 2 respectively receive the CDCP messages for requesting SVIDs sent by the EVB station, the EVB bridge 1 and the EVB bridge 2 mutually send an S-channel request authentication message, which contains the requested S-channels in the respectively received CDCP messages, to authenticate whether the received requests are complementary.

During an implementation, after the EVB bridge 1 and the EVB bridge 2 receive the S-channel request authentication message sent by the opposite side, the EVB bridge 1 and the EVB bridge 2 respectively extract S-channel information which is carried in the S-channel request authentication message, and requested by the EVB station from the opposite side, then compare the S-channel information carried in the CDCP message for requesting SVIDs received from the EVB station by the present side with the S-channel information which is carried in the currently received S-channel request authentication message, to authenticate whether the requests received by the EVB bridge 1 and the EVB bridge 2, both of which belong to the same portal, are complementary.

Step S1004, after the logical port UAP inside the EVB bridge 1 receives the CDCP message for requesting SVIDs sent by the EVB station and the S-channel request authentication message sent by the EVB bridge 2, the logical port UAP inside the EVB bridge 1 sends a CDCP message to the logical port UAP inside the EVB station; and if the authentication is passed, SVIDs are allocated to the requested S-channels, and if the authentication is failed, SVIDs are not allocated, only informing that the authentication fails. After the logical port UAP inside the EVB bridge 2 receive the CDCP message for requesting SVIDs sent by the EVB station and the S-channel request authentication message sent by the EVB bridge 1, the logical port UAP inside the EVB bridge 2 sends a CDCP message to the logical port UAP inside the EVB station; and if the authentication is passed, SVIDs are allocated to the requested S-channels, and if the authentication is failed, SVIDs are not allocated, only informing that the authentication fails.

If the authentication is passed, the CDCP message for allocating SVIDs sent by each EVB bridge contains multiple pairs of (SCID, SVID) information, wherein the SCIDs are consistent with the SCIDs carried in the CDCP message which is received by the EVB bridge and sent by the EVB station; available SVID values are allocated to S-channels that the EVB station requests SVIDs from the present side; and available SVID values are not allocated to S-channels that the EVB station requests SVIDs from another EVB bridge of the same portal, keeping SVID values being 0xFFF. If the authentication is failed, the CDCP message which is sent by the EVB bridge and informs that the authentication fails contains multiple pairs of (SCID, SVID) information, wherein the SCIDs are consistent with the SCIDs carried in the CDCP message which is received by the EVB bridge and sent by the EVB station, all the SVIDs being set to be an unavailable value 0xFFF.

As described previously, the current 802.1AX-REV draft standard stipulates that, when achieving the cross-node link aggregation technology, the service traffic needs to perform the load sharing among the LAG member links on the basis of an outer layer VLAN tag, and portals at two sides of the LAG adopt the same allocation algorithm. Therefore, under a normal condition, the EVB bridge 1 and the EVB bridge 2, both of which belong to a same portal, will allocate different SVID available values to S-channels which are respectively requested by the EVB station, and the SVID available values respectively allocated by the two EVB bridges correspond to LAG member links thereof respectively connected to the EVB station.

Step S1005, after receiving the CDCP message sent by the EVB bridge that allocates SVIDs or informs that the authentication is failed, the logical port UAP inside the EVB station respectively sends CDCP messages with the same content to logical port UAPs inside the EVB bridge 1 and the EVB bridge 2. If the EVB station receives the CDCP message for allocating SVIDs sent by the EVB bridge, the EVB station informs the EVB bridge 1 and the EVB bridge 2 of the SVIDs that have been configured for each S-channel by the EVB station. If the EVB station receives the CDCP message that is sent by the EVB bridge and informs that the authentication is failed, the EVB station informs the EVB bridge 1 and the EVB bridge 2 that EVB station configuring corresponding SVIDs is failed.

Herein, the CDCP message sent by the EVB station and in that SVIDs have been allocated contains multiple pairs of (SCID, SVID) information, wherein the SCIDs keep unchanged. With regard to S-channels that have obtained the SVIDs from the EVB bridge 1 or the EVB bridge 2, corresponding SVIDs of the S-channels are set to be the configured available values; and with regard to S-channels that can not obtain SVIDs from the EVB bridge 1 or the EVB bridge 2 because of authentication being failed, corresponding SVIDs of the S-channels are set to be an unavailable value 0xFFF.

It can be seen that in a scenario that an EVB station accesses two EVB bridges in a dual-homing manner, the present embodiment satisfies, by expanding the CDCP protocol defined by the IEEE 802.1Qbg standard and the exchanged information which is defined by the IEEE 802.1AX-REV draft standard and is between nodes participating in cross-node link aggregation, the requirements of establishing logical channels between the EVB station and the EVB bridge, at the same time achieving load sharing of server traffic and redundancy protection of an uplink. In addition, the information exchange between the EVB bridges of one portal is increased so as to, in a scenario that an EVB station accesses EVB bridges in a dual-homing manner, on the basis that the two EVB bridges coordinate with each other, respectively allocate SVIDs to the EVB station, respectively establish logical S-channels with the EVB station, thus together satisfying the request of the EVB station for the logical S-channels.

Embodiment 2

In the present embodiment, an EVB station contains five ERs, so it is required to establish five logical S-channels, three logical S-channels of the five logical S-channels are manually assigned to be allocated with SVIDs by EVB bridge 1, and two logical S-channels of the five logical S-channels are allocated with SVIDs by EVB bridge 2; and both of the EVB bridge 1 and the EVB bridge 2 pass the authentication and allocate SVIDs with available values.

Figure 11:
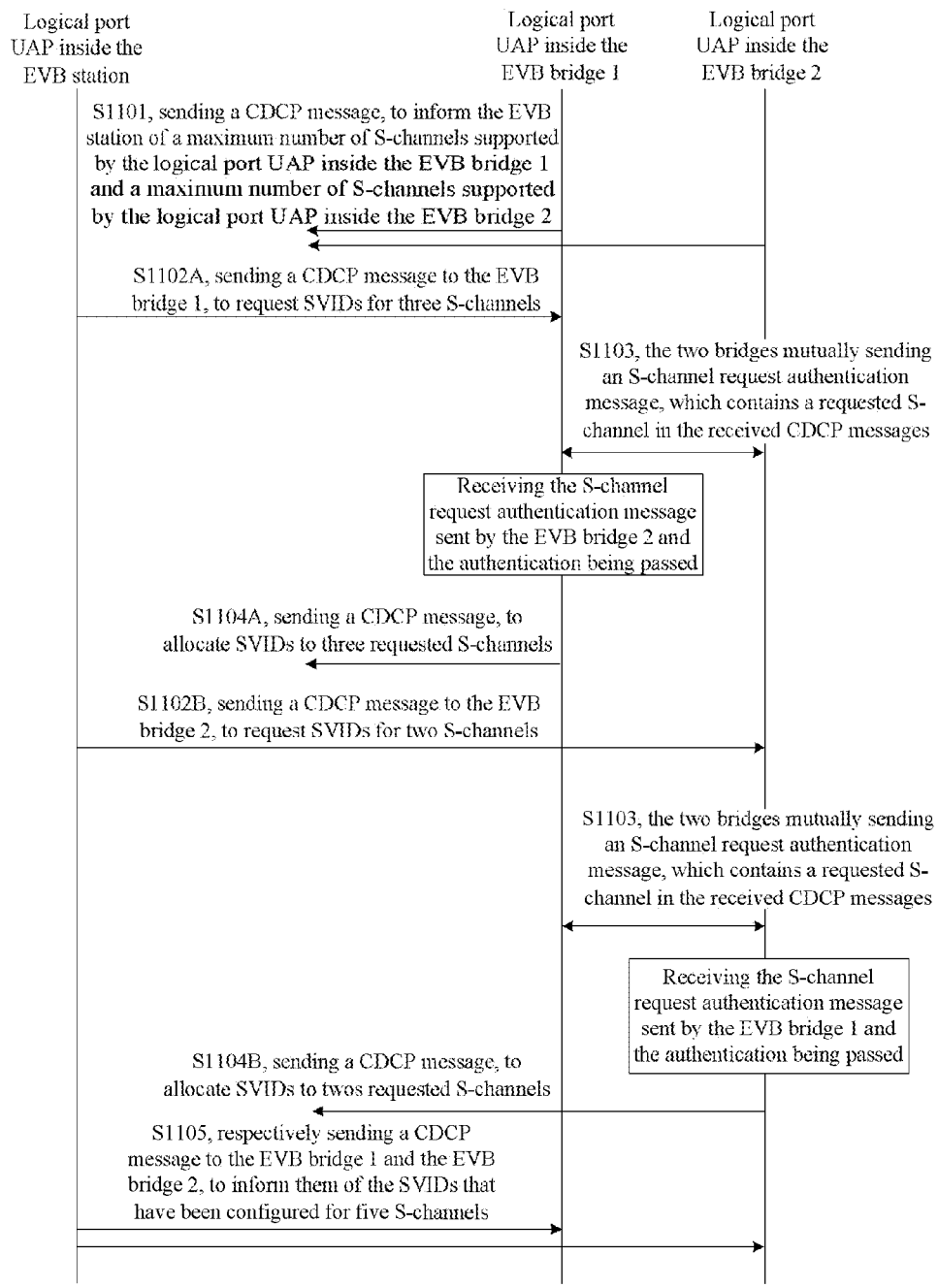
FIG. 11 is a flow schematic diagram of a method for establishing logical channels according to embodiment 2 of the present document.

FIG. 11 is a flow schematic diagram of a method for establishing logical channels according to embodiment 2 of the present document. As shown in FIG. 11, the process mainly includes the following steps:

Step S1101, after the LAG and CDCP protocol are initiated, a logical port UAP inside the EVB bridge 1 and a logical port UAP inside the EVB bridge 2 respectively send a CDCP message to a logical port UAP inside the EVB station, to inform the EVB station of a maximum number of S-channels supported by the logical port UAP inside the EVB bridge 1 and a maximum number of S-channels supported by the logical port UAP inside the EVB bridge 2.

Step S1102A and step S1102B, after the LAG and CDCP protocol are initiated, the logical port UAP inside the EVB station respectively sends a CDCP message to logical port UAP inside the EVB bridge 1 and the logical port UAP inside the EVB bridge 2; and it is required to establish five S-channels inside the EVB station, three S-channels of the five S-channels request SVIDs from the EVB bridge 1, and the rest two S-channels of the five S-channels request SVIDs from the EVB bridge 2.

Herein, the CDCP message for requesting SVIDs sent by the EVB station contains multiple pairs of (SCID, SVID) information. In the step S1102A, the CDCP message sent by the EVB station to the EVB bridge 1 contains S-channel request information {(1, 1), (2, 0), (3, 0), (4, 0), (5, 0xFFF), and (6, 0xFFF)}; SVIDs corresponding to S-channels whose SVIDs need to be requested from the EVB bridge 1 are set to be 0; and SVIDs corresponding to S-channels whose SVIDs need to be requested from the EVB bridge 2 are set to be an unavailable value 0xFFF, representing that the SVIDs will be allocated by other EVB bridges of a same portal. In the step S1102B, the CDCP message sent by the EVB station to the EVB bridge 2 contains S-channel request information {(1, 1), (2, 0xFFF), (3, 0xFFF), (4, 0xFFF), (5, 0), and (6, 0)}; SVIDs corresponding to S-channels whose SVIDs need to be requested from the EVB bridge 2 are set to be 0; and SVIDs corresponding to S-channels whose SVIDs need to be requested from the EVB bridge 1 are set to be an unavailable value 0xFFF, representing that the SVIDs will be allocated by other EVB bridges of a same portal. It should be noted that the step S1102A and the step S1102B are parallel in execution time, and not in a sequence.

Step S1103, after the EVB bridge 1 and the EVB bridge 2 respectively receive the CDCP messages for requesting SVIDs sent by the EVB station, the EVB bridge 1 and the EVB bridge 2 mutually send an S-channel request authentication message, which contains the requested S-channels in the respectively received CDCP messages, to authenticate whether the received requests are complementary.

Herein, the S-channel request authentication message mutually sent by the EVB bridge 1 and the EVB bridge 2 contains multiple pairs of (SCID, SVID) information. The S-channel request authentication message sent by the EVB bridge 1 to the EVB bridge 2 contains {(2, 0), (3, 0), and (4, 0)}, and SVIDs corresponding to S-channels whose SVIDs need to be requested from the EVB bridge 1 are set to be 0; and the S-channel request authentication message sent by the EVB bridge 2 to the EVB bridge 1 contains {(5, 0), and (6, 0)}, and SVIDs corresponding to S-channels whose SVIDs need to be requested from the EVB bridge 2 are set to be 0.

During an implementation, after the EVB bridge 1 receives the S-channel request authentication message sent by the EVB bridge 2, the EVB bridge 1 extracts the S-channel information {(5, 0), and (6, 0)} which is carried therein and requested by the EVB station from the EVB bridge 2, then the EVB bridge 1 compares the S-channel information {(5, 0), and (6, 0)} with the S-channel information {(1, 1), (2, 0), (3, 0), (4, 0), (5, 0xFFF), and (6, 0xFFF)} carried in the CDCP message for requesting SVIDs received from the EVB station and by the EVB bridge 1, and finds that the requests received by the EVB bridge 1 and the EVB bridge 2, both of which belong to the same portal, are complementary, and therefore the EVB bridge 1 passes the authentication. After the EVB bridge 2 receives the S-channel request authentication message sent by the EVB bridge 1, the EVB bridge 2 extracts the S-channel information {(2, 0), (3, 0), and (4, 0)} which is carried therein and requested by the EVB station from the EVB bridge 1, then the EVB bridge 2 compares the S-channel information {(2, 0), (3, 0), and (4, 0)} with the S-channel information {(1, 1), (2, 0xFFF), (3, 0xFFF), (4, 0xFFF), (5, 0), and (6, 0)} carried in the CDCP message for requesting SVIDs received from the EVB station and by the EVB bridge 2, and finds that the requests received by the EVB bridge 1 and the EVB bridge 2, both of which belong to the same portal, are complementary, and therefore the EVB bridge 2 passes the authentication.

Step S1104A and step S1104B, after the logical port UAP inside the EVB bridge 1 receives the CDCP message for requesting SVIDs sent by the EVB station and the S-channel request authentication message sent by the EVB bridge 2, the logical port UAP inside the EVB bridge 1 sends a CDCP message to the logical port UAP inside the EVB station; and since EVB bridge 1 passes the authentication, SVIDs are allocated to three requested S-channels. After the logical port UAP inside the EVB bridge 2 receives the CDCP message for requesting SVIDs sent by the EVB station and the S-channel request authentication message sent by the EVB bridge 1, the logical port UAP inside the EVB bridge 2 sends a CDCP message to the logical port UAP inside the EVB station; and since EVB bridge 2 passes the authentication, SVIDs are allocated to two requested S-channels.

Herein, the CDCP message for allocating SVIDs sent by the EVB bridge contains multiple pairs of (SCID, SVID) information. In the step S1104A, the CDCP message sent by the EVB bridge 1 to the EVB station contains S-channel allocation information {(1, 1), (2, 2), (3, 4), (4, 6), (5, 0xFFF), and (6, 0xFFF)}, to respectively allocate SVID available values 2, 4, and 6 to the S-channels whose S-channel IDs are 2, 3, and 4, and these SVID available values correspond to LAG member links between the EVB bridge 1 and the EVB station; and in the step S1104B, the CDCP message sent by the EVB bridge 2 to the EVB station contains S-channel allocation information {(1, 1), (2, 0xFFF), (3, 0xFFF), (4, 0xFFF), (5, 3), and (6, 5)}, to respectively allocate SVID available values 3 and 5 to the S-channels whose S-channel IDs are 5 and 6, and these SVID available values correspond to LAG member links between the EVB bridge 2 and the EVB station. It should be noted that the step S1104A and the step S1104B are parallel in execution time, and not in a sequence.

Step S1105, after receiving the CDCP messages for allocating SVIDs sent by the EVB bridge 1 and the EVB bridge 2, the logical port UAP inside the EVB station respectively sends CDCP messages with the same content to logical port UAPs inside the EVB bridge 1 and the EVB bridge 2, to inform the EVB bridge 1 and the EVB bridge 2 of the SVIDs that have been configured for each S-channel by the EVB station.

Herein, the CDCP message sent by the EVB station and in that SVIDs have been allocated contains multiple pairs of SCID and SVID information. The CDCP messages with the same content sent by the EVB station to the EVB bridge 1 and the EVB bridge 2 contain S-channel configuration information {(1, 1), (2, 2), (3, 4), (4, 6), (5, 3), and (6, 5)}, representing that the EVB station respectively configures SVID available values 2, 4, 6, 3, and 5 to S-channels whose S-channel IDs are 2, 3, 4, 5, and 6.

Embodiment 3

In the present embodiment, an EVB station contains five ERs, so it is required to establish five logical S-channels, two logical S-channels of the five logical S-channels are automatically assigned to be allocated with SVIDs by EVB bridge 1, and three logical S-channels of the five logical S-channels are allocated with SVIDs by EVB bridge 2; and the EVB bridge 1 passes the authentication and allocates SVIDs with available values, and the EVB bridge 2 fails to pass the authentication and informs that the authentication is failed.

Figure 12:
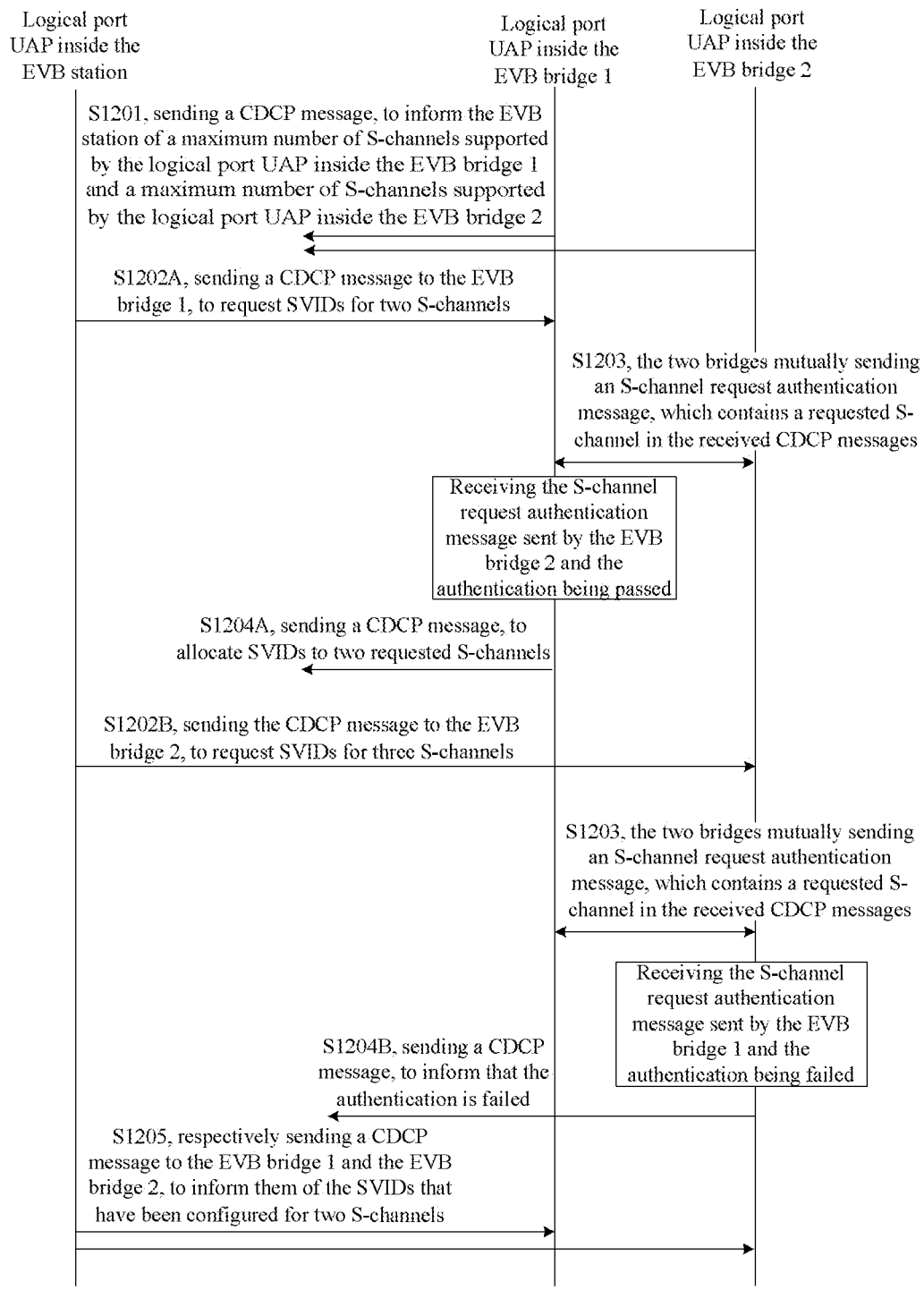
FIG. 12 is a flow schematic diagram of a method for establishing logical channels according to embodiment 3 of the present document.

FIG. 12 is a flow schematic diagram of a method for establishing logical channels according to embodiment 3 of the present document. As shown in FIG. 12, the process mainly includes the following steps:

Step S1201, after the LAG and CDCP protocol are initiated, a logical port UAP inside the EVB bridge 1 and a logical port UAP inside the EVB bridge 2 respectively send a CDCP message to a logical port UAP inside the EVB station, to inform the EVB station of a maximum number of S-channels supported by the logical port UAP inside the EVB bridge 1 and a maximum number of S-channels supported by the logical port UAP inside the EVB bridge 2.

Step S1202A and step S1202B, after the LAG and CDCP protocol are initiated, the logical port UAP inside the EVB station respectively sends a CDCP message to logical port UAP inside the EVB bridge 1 and logical port UAP inside the EVB bridge 2; and it is required to establish five S-channels inside the EVB station, two S-channels of the five S-channels request SVIDs from the EVB bridge 1, and the rest three S-channels of the five S-channels request SVIDs from the EVB bridge 2.

Herein, the CDCP message for requesting SVIDs sent by the EVB station contains multiple pairs of (SCID, SVID) information. In the step S1202A, the CDCP message sent by the EVB station to the EVB bridge 1 contains S-channel request information {(1, 1), (2, 0), (3, 0), (4, 0xFFF), (5, 0xFFF), and (6, 0xFFF)}; SVIDs corresponding to S-channels whose SVIDs need to be requested from the EVB bridge 1 are set to be 0; and SVIDs corresponding to S-channels whose SVIDs need to be requested from the EVB bridge 2 are set to be an unavailable value 0xFFF, representing that the SVIDs will be allocated by other EVB bridges of a same portal. In the step S1202B, the CDCP message sent by the EVB station to the EVB bridge 2 contains S-channel request information {(1, 1), (3, 0xFFF), (4, 0), (5, 0), and (6, 0)}; SVIDs corresponding to S-channels whose SVIDs need to be requested from the EVB bridge 2 are set to be 0; and SVIDs corresponding to S-channels whose SVIDs need to be requested from the EVB bridge 1 are set to be an unavailable value 0xFFF, representing that the SVIDs will be allocated by other EVB bridges of a same portal. It should be noted that the step S1202A and the step S1202B are parallel in execution time, and not in a sequence.

Step S1203, after the EVB bridge 1 and the EVB bridge 2 respectively receive the CDCP messages for requesting SVIDs sent by the EVB station, the EVB bridge 1 and the EVB bridge 2 mutually send an S-channel request authentication message, which contains the requested S-channels in the respectively received CDCP messages, to authenticate whether the received requests are complementary.

Herein, the S-channel request authentication message mutually sent by the EVB bridge 1 and the EVB bridge 2 contains multiple pairs of SCID and SVID information. The S-channel request authentication message sent by the EVB bridge 1 to the EVB bridge 2 contains {(2, 0), and (3, 0)}, and SVIDs corresponding to S-channels whose SVIDs need to be requested from the EVB bridge 1 are set to be 0; and the S-channel request authentication message sent by the EVB bridge 2 to the EVB bridge 1 contains {(4, 0), (5, 0), and (6, 0)}, and SVIDs corresponding to S-channels whose SVIDs need to be requested from the EVB bridge 2 are set to be 0.

During an implementation, after the EVB bridge 1 receives the S-channel request authentication message sent by the EVB bridge 2, the EVB bridge 1 extracts the S-channel information {(4, 0), (5, 0), and (6, 0)} which is carried therein and requested by the EVB station from the EVB bridge 2, then the EVB bridge 1 compares the S-channel information {(4, 0), (5, 0), and (6, 0)} with the S-channel information {(1, 1), (2, 0), (3, 0), (4, 0xFFF), (5, 0xFFF), and (6, 0xFFF)} carried in the CDCP message for requesting SVIDs received from the EVB station and by the EVB bridge 1, and finds that the requests received by the EVB bridge 1 and the requests received by the EVB bridge 2, both of which belong to a same portal, are complementary, and therefore the EVB bridge 1 passes the authentication. And after the EVB bridge 2 receives the S-channel request authentication message sent by the EVB bridge 1, the EVB bridge 2 extracts the S-channel information {(2, 0), and (3, 0)} which is carried therein and requested by the EVB station from the EVB bridge 1, then compares the S-channel information {(2, 0), and (3, 0)} with the S-channel information {(1, 1), (3, 0xFFF), (4, 0), (5, 0), and (6, 0)} carried in the CDCP message for requesting SVIDs received from the EVB station and by the EVB bridge 2, and finds that the requests received by the EVB bridge 1 and the requests received by the EVB bridge 2, both of which belong to the same portal, are not complementary, and therefore the EVB bridge 2 fails to pass the authentication.

Step S1204A and step S1204B, after the logical port UAP inside the EVB bridge 1 receives the CDCP message for requesting SVIDs sent by the EVB station and the S-channel request authentication message sent by the EVB bridge 2, the logical port UAP inside the EVB bridge 1 sends a CDCP message to the logical port UAP inside the EVB station; and since EVB bridge 1 passes the authentication, SVIDs are allocated to two requested S-channels. After the logical port UAP inside the EVB bridge 2 receives the CDCP message for requesting SVIDs sent by the EVB station and the S-channel request authentication message sent by the EVB bridge 1, the logical port UAP inside the EVB bridge 2 sends a CDCP message to the logical port UAP inside the EVB station; and since EVB bridge 2 fails to pass the authentication, SVIDs are not allocated to three requested S-channels, only informing the EVB station that the authentication fails.

Herein, the CDCP message sent by the EVB bridge that allocates SVIDs or informs that the authentication fails contains multiple pairs of (SCID, SVID) information. In the step S1204A, the CDCP message sent by the EVB bridge 1 to the EVB station contains S-channel allocation information {(1, 1), (2, 2), (3, 4), (4, 0xFFF), (5, 0xFFF), and (6, 0xFFF)}, to respectively allocate SVID available values 2, and 4 to the S-channels whose S-channel IDs are 2, and 3, and these SVID available values correspond to LAG member links between the EVB bridge 1 and the EVB station; and in step the S1204B, the CDCP message sent by the EVB bridge 2 to the EVB station contains informing authentication failure information {(1, 1), (3, 0xFFF), (4, 0xFFF), (5, 0xFFF), and (6, 0xFFF)}, to set all the to-be-allocated SVIDs to be an unavailable value 0xFFF, representing that the EVB bridge 2 fails to pass the authentication, and being not able to allocate SVIDs. It should be noted that the step S1204A and the step S1204B are parallel in execution time, and not in a sequence.

Step S1205, after receiving the CDCP messages for allocating SVIDs sent by the EVB bridge 1 and the CDCP message sent by the EVB bridge 2 that informs that the authentication is failed, the logical port UAP inside the EVB station respectively sends CDCP messages with the same content to logical port UAPs inside the EVB bridge 1 and the EVB bridge 2, to inform the EVB bridge 1 and the EVB bridge 2 of the SVIDs that have been configured for two S-channels by the EVB station.

Herein, the CDCP message sent by the EVB station in that SVIDs have been allocated contains multiple pairs of SCID and SVID information. The CDCP messages with the same content sent by the EVB station to the EVB bridge 1 and the EVB bridge 2 contain S-channel configuration information {(1, 1), (2, 2), (3, 4), (4, 0xFFF), (5, 0xFFF), and (6, 0xFFF)}, representing that the EVB station respectively configures SVID available values 2 and 4 to S-channels whose S-channel IDs are 2 and 3, also representing that the other three to-be-allocated S-channels whose S-channel IDs are 4, 5, and 6 can not be allocated and configured with SVIDs because the EVB bridge fails to pass the authentication.

It can be seen from the above-mentiond embodiments, the embodiments of the present document are that an EVB station respectively requests a part of required logical S-channels from the EVB bridge 1 and the EVB bridge 2, and respectively informs the two EVB bridges of all the obtained and configured SVIDs after respectively obtaining and configuring SVIDs allocated by the EVB bridge 1 and the EVB bridge 2. In addition, the EVB station can also inform the EVB bridge of logical S-channels requested from another EVB bridge of the portal, thereby the EVB bridge 1 and the EVB bridge 2 can send an S-channel request authentication message to each other, and authenticate whether the received requests are complementary.

In summary, the embodiments of the present document provide a method for establishing logical channels in a server dual-homing access scenario, and adopt a way of expanding a CDCP protocol so that an EVB station can use an cross-node link aggregation technology to access two network edge physical switches in a dual-homing manner via two physical ports, thus achieving load sharing of server traffic and redundancy protection of an uplink.

Obviously, those skilled in the art shall understand that the above-mentioned components and steps of the present document can be realized by using general purpose calculating device, can be integrated in one calculating device or distributed on a network which consists of a plurality of calculating devices. Alternatively, the components and the steps of the present document can be realized by using the executable program code of the calculating device. Consequently, they can be stored in the storing device and executed by the calculating device, or they are made into integrated circuit component respectively, or a plurality of components or steps thereof are made into one integrated circuit component. In this way, the present document is not restricted to any particular hardware and software combination.

The above description is only example embodiments of the present document and is not intended to limit the present document, and the present document can have a variety of changes and modifications for those skilled in the art. Any modification, equivalent replacement, or improvement made within the spirit and principle of the present document shall all fall within the protection scope of the present document.

What is claimed is:

1. A logical channel establishing method, comprising:
an edge virtual bridging (EVB) station respectively sending a first S-channel discovery and configuration protocol (CDCP) message to a first EVB bridge and a second EVB bridge, both of which belong to a same link aggregation group (LAG) portal, to request for S-virtual local area network identifiers (SVIDs) corresponding to required logical S-channels, wherein the EVB station requests the first EVB bridge for SVIDs of a part of logical S-channels in the required logical S-channels, and the EVB station requests the second EVB bridge for SVIDs of the rest part of the logical S-channels in the required logical S-channels;
the EVB station respectively obtaining the SVIDs allocated by the first EVB bridge and the second EVB bridge according to the first CDCP message; and
the EVB station configuring the allocated SVIDs to the corresponding logical S-channels, and respectively sending a second CDCP message to the first EVB bridge and the second EVB bridge, to respectively inform the first EVB bridge and the second EVB bridge of all SVIDs configured by the EVB station for the required logical S-channels.

2. The method according to claim 1, wherein before the EVB station respectively sends the first CDCP message to the first EVB bridge and the second EVB bridge, the method further comprises:
an uplink access port (UAP) inside the first EVB bridge and a UAP inside the second EVB bridge respectively sending a third CDCP message to a UAP inside the EVB station, to respectively inform the EVB station of a maximum number of S-channels supported by the UAP inside the first EVB bridge and a maximum number of S-channels supported by the UAP inside the second EVB bridge.

3. The method according to claim 1, wherein multiple pairs of S-Channel ID (SCID) and SVID information groups are carried in the first CDCP message, wherein values of the SVIDs comprise: a first predetermined value or a second predetermined value, the first predetermined value being used for indicating that it is required to allocate SVIDs of logical S-channels corresponding to the SCIDs which are paired with the SVIDs, and the second pre-determined value being used for indicating that it is unnecessary to allocate SVIDs of logical S-channels corresponding to SCIDs which are paired with the SVIDs.

4. The method according to claim 3, wherein the first predetermined value is 0, and the second predetermined value is 0xFFF.

5. The method according to claim 1, wherein multiple pairs of SCID and SVID information groups are carried in the second CDCP message, wherein values of the SVIDs comprise: SVIDs obtained from the first EVB bridge and have been configured to corresponding logical S-channels and SVIDs obtained from the second EVB bridge and have been configured to corresponding logical S-channels.

6. The method according to claim 1, wherein before the EVB station respectively obtains the SVIDs allocated by the first EVB bridge and the second EVB bridge according to the first CDCP message, the method further comprises:
the first EVB bridge and the second EVB bridge respectively determining, according to the first CDCP message received from the EVB station, SCIDs requiring to be allocated with SVIDs by the first EVB bridge and SCIDs requiring to be allocated with SVIDs by the second EVB bridge, and allocating corresponding SVIDs to the determined SCIDs.

7. The method according to claim 6, wherein before the first EVB bridge and the second EVB bridge respectively determine, according to the received first CDCP message, SCIDs requiring to be allocated with SVIDs by the first EVB bridge and SCIDs requiring to be allocated with SVIDs by the second EVB bridge, the method further comprises:

the first EVB bridge and the second EVB bridge sending an S-channel request authentication message to each other, performing comparison based on S-channel information carried in the first CDCP message received by the first EVB bridge from the EVB station and S-channel information carried in the first CDCP message received by the second EVB bridge from the EVB station, and determining that the logical S-channels to which the EVB station requests the first EVB bridge to allocate the SVIDs and the logical S-channels to which the EVB station requests the second EVB bridge to allocate the SVIDs are complementary.

8. The method according to claim 7, wherein comparing S-channel information carried in the first CDCP message received by the first EVB bridge from the EVB station and S-channel information carried in the first CDCP message received by the second EVB bridge from the EVB station comprises:

respectively extracting, from the first CDCP message received by the first EVB bridge and the first CDCP message received by the second EVB bridge, logical S-channels requiring to be allocated with SVIDs by the first EVB bridge and logical S-channels requiring to be allocated with SVIDs by the second EVB bridge, and performing comparison; and upon a result of the comparison representing identicalness, determining that the logical S-channels to which the EVB station requests the first EVB bridge to allocate the SVIDs and the logical S-channels to which the EVB station requests the second EVB bridge to allocate the SVIDs are complementary, and authentication being passed; otherwise, determining that the logical S-channels to which the EVB station requests the first EVB bridge to allocate the SVIDs and the logical S-channels to which the EVB station requests the second EVB bridge to allocate the SVIDs are not complementary, the authentication being failed, and informing the EVB station of logical S-channels corresponding to the authentication failure.

9. The method according to claim 1, wherein after the EVB station respectively informs the first EVB bridge and the second EVB bridge of all the SVIDs configured by the EVB station for the required logical S-channels, the method further comprises:

the first EVB bridge and the second EVB bridge receiving the second CDCP message from the EVB station for informing the first EVB bridge and the second EVB bridge of all the SVIDs configured by the EVB station for the required logical S-channels, and performing corresponding processing, wherein SVIDs allocated by the present bridge in all the SVIDs are configured to corresponding logical S-channels, and SVIDs allocated by a bridge other than the present bridge in all the SVIDs are saved as standby information about link aggregation protection.

10. An edge virtual bridging (EVB) station, which comprises a hardware processor and a memory, and the hardware processor is configured to execute programming components stored in the memory, the programming components comprise:

a sending component, configured to respectively send a first S-channel discovery and configuration protocol (CDCP) message to a first EVB bridge and a second EVB bridge, both of which belong to a same link aggregation group (LAG) portal, to request for S-virtual local area network identifiers (SVIDs) corresponding to required logical S-channels, wherein the EVB station requests the first EVB bridge for SVIDs of a part of logical S-channels in the required logical S-channels, and the EVB station requests the second EVB bridge for SVIDs of the rest part of the logical S-channels in the required logical S-channels;

a receiving component, configured to respectively obtain the SVIDs allocated by the first EVB bridge and the second EVB bridge according to the first CDCP message;

a configuration component, configured to configure the allocated SVIDs received by the receiving component to corresponding logical S-channels; and an informing component, configured to respectively send a second CDCP message to the first EVB bridge and the second EVB bridge, to respectively inform the first EVB bridge and the second EVB bridge of all SVIDs configured by the EVB station for the required logical S-channels.

11. An edge virtual bridging (EVB) bridge, which comprises a hardware processor and a memory, and the hardware processor is configured to execute programming components stored in the memory, the programming components comprise:

an allocation component, configured to identify, from a first S-channel discovery and configuration protocol (CDCP) message received from a EVB station, a part of logical S-channels requiring to be allocated with S-virtual local area network identifiers (SVIDs) by the EVB bridge in required logical S-channels of the EVB station, to allocate corresponding SVIDs to the part of logical S-channels, and to send the allocated SVIDs to the EVB station, wherein the first CDCP message is used for requesting for SVIDs corresponding to the required logical S-channels of the EVB station, and SVIDs corresponding to the rest part of logical S-channels of the required logical S-channels of the EVB station in the first CDCP message are allocated by another EVB bridge which belongs to a same link aggregation group (LAG) portal as the present EVB bridge.

12. The EVB bridge according to claim 11, wherein the programming component further comprises:

an informing information processing component, configured to, according to the second CDCP message received from the EVB station for informing the EVB bridge of all the SVIDs configured by the EVB station for the required logical S-channels, perform corresponding processing, wherein SVIDs allocated by the present bridge in all the SVIDs are configured to corresponding logical S-channels, and SVIDs allocated by a bridge other than the present bridge in all the SVIDs are saved as standby information about link aggregation protection.

13. A logical channel establishing system, comprising an EVB station, the EVB bridge as claimed in claim 12, and the another EVB bridge which belongs to the same link aggregation group (LAG) portal as the EVB bridge, wherein the EVB station which comprises a hardware processor and a memory, and the hardware processor is configured to execute programming components stored in the memory, the programming components comprises:

a sending component, configured to respectively send a first S-channel discovery and configuration protocol (CDCP) message to a first EVB bridge and a second EVB bridge, both of which belong to a same link aggregation group (LAG) portal, to request for S-virtual local area network identifiers (SVIDs) corresponding to required logical S-channels, wherein the EVB station requests the first EVB bridge for SVIDs of a part of logical S-channels in the required logical S-channels, and the EVB station requests the second EVB bridge for SVIDs of the rest part of the logical S-channels in the required logical S-channels;

a receiving component, configured to respectively obtain the SVIDs allocated by the first EVB bridge and the second EVB bridge according to the first CDCP message;

a configuration component, configured to configure the allocated SVIDs received by the receiving component to corresponding logical S-channels; and an informing component, configured to respectively send a second CDCP message to the first EVB bridge and the second EVB bridge, to respectively inform the first EVB bridge and the second EVB bridge of all SVIDs configured by the EVB station for the required logical S-channels.

14. The EVB bridge according to claim 11, wherein the programming component further comprises:

an authentication component, configured to, according to the first CDCP message received from the EVB station, send an S-channel request authentication message to each other between the present bridge and the another EVB bridge, performing comparison based on S-channel information carried in the first CDCP message received by the present bridge from the EVB station and S-channel information carried in the first CDCP message received by the another EVB bridge from the EVB station, and determine that logical S-channels to which the EVB station requests the present bridge to allocate the SVIDs and logical S-channels to which the EVB station requests the another EVB bridge to allocate the SVIDs are complementary.

15. A logical channel establishing system, comprising an EVB station, the EVB bridge as claimed in claim 14, and the another EVB bridge which belongs to the same link aggregation group (LAG) portal as the EVB bridge, wherein the EVB station which comprises a hardware processor and a memory, and the hardware processor is configured to execute programming components stored in the memory, the programming components comprises:

a sending component, configured to respectively send a first S-channel discovery and configuration protocol (CDCP) message to a first EVB bridge and a second EVB bridge, both of which belong to a same link aggregation group (LAG) portal, to request for S-virtual local area network identifiers (SVIDs) corresponding to required logical S-channels, wherein the EVB station requests the first EVB bridge for SVIDs of a part of logical S-channels in the required logical S-channels, and the EVB station requests the second EVB bridge for SVIDs of the rest part of the logical S-channels in the required logical S-channels;

a receiving component, configured to respectively obtain the SVIDs allocated by the first EVB bridge and the second EVB bridge according to the first CDCP message;

a configuration component, configured to configure the allocated SVIDs received by the receiving component to corresponding logical S-channels; and an informing component, configured to respectively send a second CDCP message to the first EVB bridge and the second EVB bridge, to respectively inform the first EVB bridge and the second EVB bridge of all SVIDs configured by the EVB station for the required logical S-channels.

16. A logical channel establishing system, comprising an EVB station, the EVB bridge as claimed in claim 11, and the another EVB bridge which belongs to the same link aggregation group (LAG) portal as the EVB bridge, wherein the EVB station which comprises a hardware processor and a memory, and the hardware processor is configured to execute programming components stored in the memory, the programming components comprises:

a sending component, configured to respectively send a first S-channel discovery and configuration protocol (CDCP) message to a first EVB bridge and a second EVB bridge, both of which belong to a same link aggregation group (LAG) portal, to request for S-virtual local area network identifiers (SVIDs) corresponding to required logical S-channels, wherein the EVB station requests the first EVB bridge for SVIDs of a part of logical S-channels in the required logical S-channels, and the EVB station requests the second EVB bridge for SVIDs of the rest part of the logical S-channels in the required logical S-channels;

a receiving component, configured to respectively obtain the SVIDs allocated by the first EVB bridge and the second EVB bridge according to the first CDCP message;

a configuration component, configured to configure the allocated SVIDs received by the receiving component to corresponding logical S-channels; and an informing component, configured to respectively send a second CDCP message to the first EVB bridge and the second EVB bridge, to respectively inform the first EVB bridge and the second EVB bridge of all SVIDs configured by the EVB station for the required logical S-channels.

* * * * *